United States Patent
Gao et al.

(10) Patent No.: US 11,437,628 B2
(45) Date of Patent: Sep. 6, 2022

(54) METHOD FOR GENERATING ELECTRICAL ENERGY

(71) Applicants: Tsinghua University, Beijing (CN); HON HAI PRECISION INDUSTRY CO., LTD., New Taipei (TW)

(72) Inventors: Dan Gao, Beijing (CN); Chang-Hong Liu, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 720 days.

(21) Appl. No.: 16/455,951

(22) Filed: Jun. 28, 2019

(65) Prior Publication Data

US 2020/0381739 A1   Dec. 3, 2020

(30) Foreign Application Priority Data

May 30, 2019   (CN) .......................... 201910465705.3

(51) Int. Cl.
| | |
|---|---|
| *H01M 4/86* | (2006.01) |
| *H01M 8/1016* | (2016.01) |
| *H01G 11/36* | (2013.01) |
| *H01M 4/583* | (2010.01) |
| *H01M 4/60* | (2006.01) |
| *H01M 4/96* | (2006.01) |

(Continued)

(52) U.S. Cl.
CPC .......... *H01M 4/8605* (2013.01); *H01G 11/36* (2013.01); *H01M 4/583* (2013.01); *H01M 4/606* (2013.01); *H01M 4/8626* (2013.01); *H01M 4/96* (2013.01); *H01M 8/1016* (2013.01); *H01M 50/409* (2021.01); *H01G 11/52* (2013.01)

(58) Field of Classification Search
CPC ....... H01M 8/227; B01D 2325/42; C25B 1/04
See application file for complete search history.

(56) References Cited

U.S. PATENT DOCUMENTS

| | | | |
|---|---|---|---|
| 2013/0141050 A1 | 6/2013 | Visco et al. | |
| 2015/0072267 A1* | 3/2015 | Suss ...................... | H01M 8/227 429/499 |
| 2015/0214555 A1 | 7/2015 | Visco et al. | |

FOREIGN PATENT DOCUMENTS

| | | |
|---|---|---|
| CN | 103337376 | 10/2013 |
| CN | 104054209 | 9/2014 |

(Continued)

OTHER PUBLICATIONS

Ruhao Liu et al. "Hydrocapacitor for Harvesting and Storing Energy from Water Movement", ACS Applied Materials & Interfaces, 35273-35280, Sep. 21, 2018.

(Continued)

*Primary Examiner* — Stephan J Essex
(74) *Attorney, Agent, or Firm* — ScienBiziP, P.C.

(57) ABSTRACT

A method for generating electrical energy includes providing an electrical energy generating element. The electrical energy generating element includes a first porous electrode, an eggshell membrane, and a second porous electrode stacked on each other in that order. The electrical energy generating element has a first side and a second side opposite to the first side. A liquid having positive ions and negative ions is allowed to penetrate the electrical energy generating element from the first side to the second side.

18 Claims, 26 Drawing Sheets

(51) Int. Cl.
    *H01M 50/409*    (2021.01)
    *H01G 11/52*     (2013.01)

(56) References Cited

FOREIGN PATENT DOCUMENTS

| | | |
|---|---|---|
| CN | 106025150 | 10/2016 |
| CN | 109482152 | 3/2019 |
| WO | 2019044042 | 3/2019 |

OTHER PUBLICATIONS

Ma, L., Chen, R., Hu, Y., Zhang, W., Zhu, G., Zhao, P., et al. "Nanoporous and lyophilic battery separator from regenerated egg-shell membrane with effective suppression of dendritic lithium growth", Energy Storage Material, vol. 14, pp. 258-266, Sep. 2018.

* cited by examiner

METHOD FOR GENERATING ELECTRICAL ENERGY

CROSS-REFERENCE TO RELATED APPLICATIONS

This application is related to commonly-assigned application entitled, "ELECTRICAL ENERGY GENERATING ELEMENT", concurrently filed Ser. No. 16/455,936; "METHOD FOR MAKING ELECTRICAL ENERGY GENERATING ELEMENT", concurrently filed Ser. No. 16/455,941; "ELECTRICAL ENERGY GENERATING DEVICE", concurrently filed Ser. No. 16/455,927; "DECORATIVE RING", concurrently filed Ser. No. 16/455,963. The entire contents of which are incorporated herein by reference.

FIELD

The present application relates to a method for generating electrical energy.

BACKGROUND

The majority of energy consumptions depend on non-renewable energy sources, such as coal, oil, natural gas, and nuclear energy. In view of the large consumption and the limited reserves of the non-renewable energy sources, as well as the pollution caused by such methods of energy consumptions, people are committed to the development of new or renewable energy sources and the recycling of energy.

Water is an energy source that has little impact on the environment and ecology, thus hydro-electric generating technology is being developed. The water flowing drives the generator, thus the hydroelectric power is generated. However, the hydro-electric power generation requires specialized electrical generator sets and also requires dams to supply large-scale water flows.

Therefore, there is room for improvement in the art.

BRIEF DESCRIPTION OF THE DRAWINGS

Implementations of the present technology will now be described, by way of embodiments, with reference to the attached figures, wherein.

DETAILED DESCRIPTION

Figure 1A:
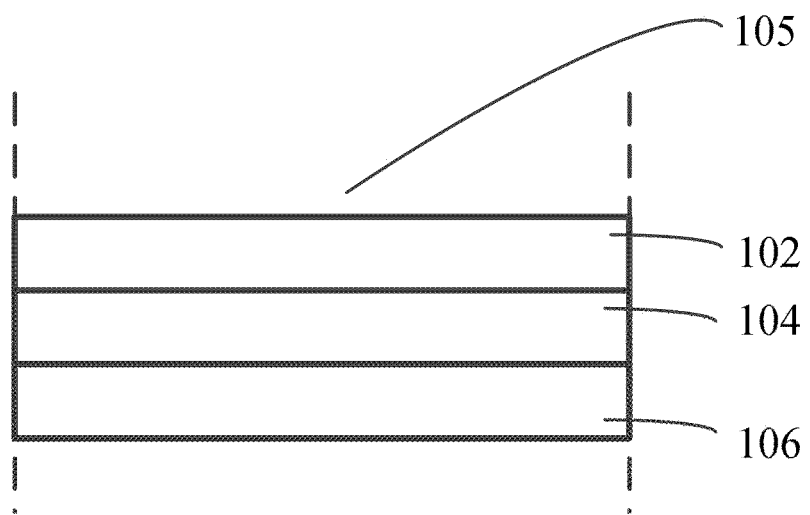
FIG. 1A shows a schematic view of a first embodiment of an electrical energy generating element.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to illustrate details and features better. The description is not to be considered as limiting the scope of the embodiments described herein.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising"

means "including, but not necessarily limited to"; it specifically indicates open-ended inclusion or membership in a so-described combination, group, series and the like.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 1A shows an electrical energy generating element 100 of a first embodiment. The electrical energy generating element 100 includes a first electrode 102, an eggshell membrane 104, and a second electrode 106 stacked on each other in that order. The eggshell membrane 104 is sandwiched between the first electrode 102 and the second electrode 106. In one embodiment, the eggshell membrane 104 is in direct contact with both the first electrode 102 and the second electrode 106.

Figure 9:
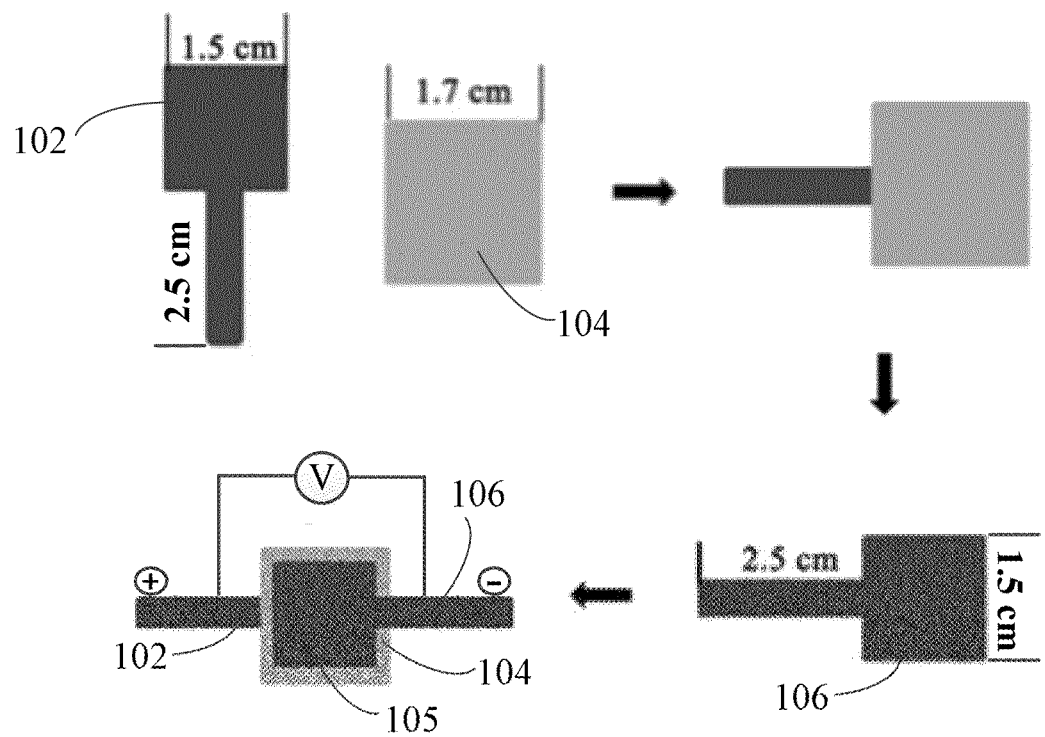
FIG. 9 is a process flow of a first embodiment of forming the electrical energy generating element of FIG. 1 by the CNT/PANI composite structure and the eggshell membrane.

In order to avoid a short circuit, the first electrode 102 and the second electrode 106 are spaced apart from each other. The overlapping portion of the first electrode 102 and the second electrode 106 is defined as an overlapping region 105. In one embodiment, the area (or size) of the eggshell membrane 104 is greater than or equal to the area (or size) of the overlapping region 105, so that the first electrode 102 and the second electrode 106 are insulated from each other by the eggshell membrane 104. In the electrical energy generating element 100 of FIG. 1, the entire first electrode 102 and the entire second electrode 106 are completely overlapped with each other, and the overlapping region 105 is the entire first electrode 102 or the entire second electrode 106. In other embodiments, the first electrode 102 and the second electrode 106 can also be partially overlapped with each other, as shown in FIG. 9.

The first electrode 102 and the second electrode 106 are porous and electrical conductive. The first electrode 102 and the second electrode 106 can be a network structure or formed by a porous conductive material. The first electrode 102 and the second electrode 106 can be a carbon nanotube film including a plurality of carbon nanotubes, a metal mesh, or a porous metal sheet. In one embodiment, each of the first electrode 102 and the second electrode 106 is a carbon nanotube composite structure. In one embodiment, each of the first electrode 102 and the second electrode 106 is a composite structure of carbon nanotube and polyaniline (CNT/PANI composite structure).

The CNT/PANI composite structure includes a carbon nanotube network structure and a polyaniline layer, wherein the polyaniline layer is formed by polyaniline. In one embodiment, the carbon nanotube network structure is a carbon nanotube paper.

The carbon nanotube network structure includes a plurality of carbon nanotubes combined by van der Waals attractive force therebetween and forming a free-standing film network. The term "free-standing" includes, but is not limited to, a structure that does not have to be supported by a substrate and the free-standing structure can sustain its own weight when it is hoisted by a portion of the structure without any significant damage to its structural integrity. The free-standing property is achieved due to the van der Waals attractive force between adjacent carbon nanotubes. The carbon nanotube network structure includes a plurality of micropores formed by adjacent carbon nanotubes, thus the CNT/PANI composite structure is the porous conductive material.

The polyaniline layer is coated on a surface of the carbon nanotube network structure. The polyaniline layer wraps around each of the plurality of carbon nanotubes to form a tubular coating planar structure. The carbon nanotube network structure serves as the core and the template to support the polyaniline layer. In one embodiment, the polyaniline layer is coated on the entire surface of the carbon nanotube network structure, such that the surface of each carbon nanotube is completely coated by the polyaniline layer.

The plurality of carbon nanotubes can be single-walled, double-walled, multi-walled carbon nanotubes, or their combinations. The plurality of carbon nanotubes which are single-walled have a diameter of about 0.5 nanometers (nm) to about 50 nm. The plurality of carbon nanotubes which are double-walled have a diameter of about 1.0 nm to about 50 nm. The plurality of carbon nanotubes which are multi-walled have a diameter of about 1.5 nm to about 50 nm. In one embodiment, the carbon nanotube network structure includes the plurality of carbon nanotubes disorderly arranged and parallel to the surface of the carbon nanotube network structure.

Figure 1B:
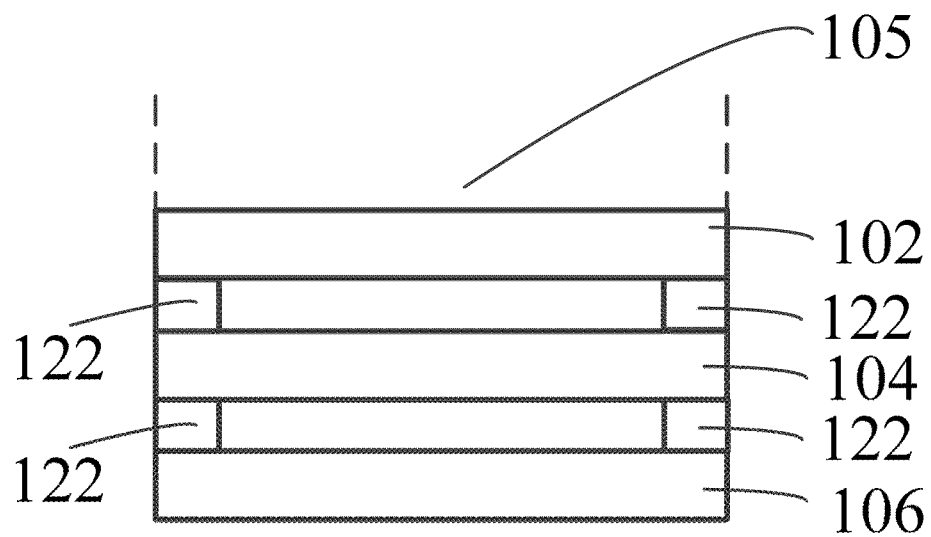
FIG. 1B shows a schematic view of a first embodiment of another electrical energy generating element.

In order to better combine the eggshell membrane 104 with the first electrode 102 (and/or the second electrode 106), adhesive 122 can be located on a portion of eggshell membrane 104. The adhesive 122 cannot be located on the entire surface of the eggshell membrane 104, as shown in FIG. 1B.

In one embodiment, the first electrode 102 is located gravitationally above the eggshell membrane 104, and the second electrode 106 is located gravitationally below the eggshell membrane 104. When the electrical energy generating element 100 is measured for electrical potential, the first electrode 102 is electrically connected with a negative electrode of a voltmeter, and the second electrode 106 is electrically connected with a positive electrode of the voltmeter.

The eggshell membrane 104 can be from egg, duck egg, goose egg, quail egg, or any other bird eggs. A thickness and a size of the eggshell membrane 104 are not limited and can be selected according to actual needs. In one embodiment, the eggshell membrane 104 is from an egg, and the shape of the eggshell membrane 104 is a square of $1.7 \times 1.7$ cm$^2$.

Figure 2:
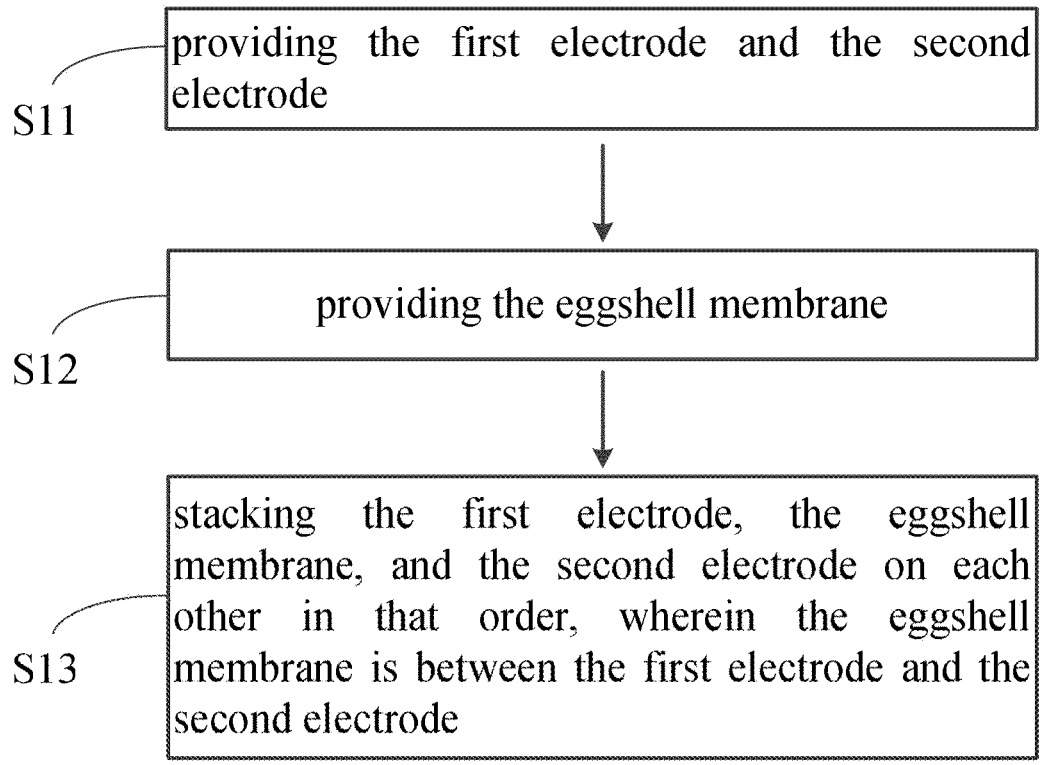
FIG. 2 is a process flow of a first embodiment of a method for making the electrical energy generating element of FIG. 1.

FIG. 2 shows a method for making the electrical energy generating element 100 of the first embodiment, and the method includes one or more of the following steps:

S11, providing the first electrode 102 and the second electrode 106;

S12, providing the eggshell membrane 104; and

S13, stacking the first electrode 102, the eggshell membrane 104, and the second electrode 106 on each other in that order, wherein the eggshell membrane 104 is between the first electrode 102 and the second electrode 106.

During step S11, each of the first electrode 102 and the second electrode 106 is the CNT/PANI composite structure. In one embodiment, a method for making the CNT/PANI composite structure includes one or more of the following steps:

S111, flocculating carbon nanotubes in a solvent, to obtain a carbon nanotube flocculated structure, wherein the solvent is selected from water or volatile organic solvent, and the flocculating the carbon nanotube is performed by ultrasonic dispersion or high-strength stirring;

S112, spreading the carbon nanotube flocculated structure according to a predetermined shape;

S113, applying a certain pressure to the spread carbon nanotube flocculated structure and drying, to obtain the carbon nanotube network structure;

S114, immersing the carbon nanotube network structure in 40 ml aniline solution containing 0.04 mol HCL and 0.002 mol L$^{-1}$ aniline monomers (purity ≥99.5%) for ten minutes, to form a first mixed solution;

S115, dropping 40 ml precooled aqueous solution containing 0.002 mol ammonium persulfate into the first mixed solution, to form a second mixed solution, wherein the ammonium persulfate is as oxidant for polymerization;

S116, maintaining the second mixed solution at 0 degrees Celsius for 24 hours to react completely, so that the polyaniline layer is coated uniformly on the carbon nanotube network structure, to form the CNT/PANI composite structure; and S117, removing the CNT/PANI composite structure from the reacted solution, cleaning the CNT/PANI composite structure with deionized water, and drying the CNT/PANI composite structure at 80 degrees Celsius in the vacuum oven for 12 hours.

Figure 3:
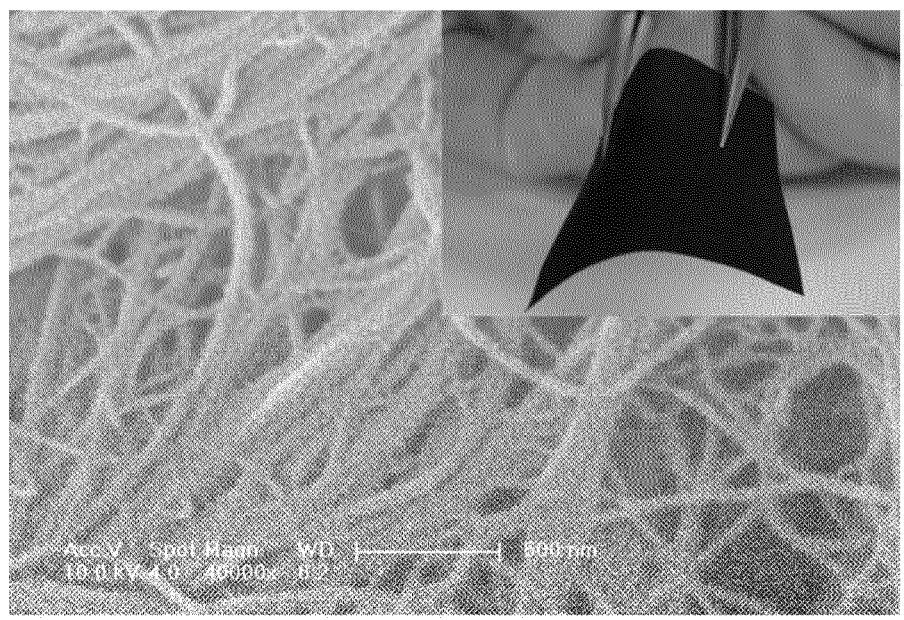
FIG. 3 shows a scanning electron microscope (SEM) image and an optical image of a first embodiment of a CNT/PANI composite structure.

FIG. 3 shows a scanning electron microscope (SEM) image and an optical image of the CNT/PANI composite structure.

Figure 4A:
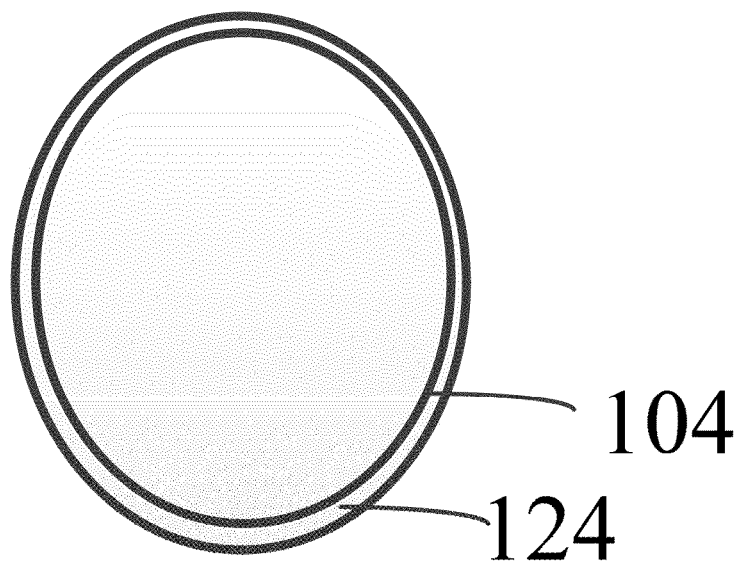
FIG. 4A shows an schematic view of a first embodiment of composite structure of an eggshell and an eggshell membrane.

During step S12, the method for obtaining the eggshell membrane 104 is not limited. In one embodiment, the method for obtaining the eggshell membrane 104 includes:

S121, taking out the egg liquid from an egg to obtain a composite of an eggshell 124 and the eggshell membrane 104, as shown in FIG. 4A, and washing the composite of the eggshell 124 and the eggshell membrane 104;

S122, peeling off the eggshell membrane 104 from the eggshell 124, to obtain the eggshell membrane 104; and S123, washing the eggshell membrane 104 with deionized water.

During step S121, one end of the egg is broken, and the egg liquid is poured or sucked out. The residual egg liquid is removed by deionized water. During step S123, the eggshell membrane 104 does not need to be completely dried. The completely drying the eggshell membrane 104 may cause the eggshell membrane 104 to be uneven or broken. The uneven or broken eggshell membrane 104 may cause the eggshell membrane 104 cannot be in good contact with the first electrode 102 and/or the second electrode 106. In one embodiment, the residual deionized water in the eggshell membrane 104 can be absorbed by a paper.

In another embodiment, the method for obtaining the eggshell membrane 104 includes:

S121', taking out the egg liquid from the egg to obtain the composite of the eggshell 124 and the eggshell membrane 104, and washing the composite of the eggshell 124 and the eggshell membrane 104;

S122', placing the composite of the eggshell 124 and the eggshell membrane 104 into an acidic solution for a period of time, to obtain the eggshell membrane 104; and S123', taking out the eggshell membrane 104 from the acidic solution and washing the eggshell membrane 104 with deionized water.

During step S122', the composition of the eggshell 124 is calcium carbonate. When the composite of the eggshell 124 and the eggshell membrane 104 is kept in the acidic solution for a period of time, the calcium carbonate of the eggshell 124 can react with the acid of the acidic solution so that the eggshell 124 is eroded, thus the eggshell membrane 104 is obtained. The acidic solution can be sulfuric acid, hydrochloric acid, and so on. During step S123', the eggshell membrane 104 is washed with the deionized water. Thus, the calcium chloride as a reaction product in the step S122' and the residual acidic solution can be removed.

During step S13, to ensure the first electrode 102 and the second electrode 106 are not in direct contact with each other, the size of the eggshell membrane 104 can be greater than or equal to the size of the overlapping region 105.

The method for making the electrical energy generating element 100 further includes fixing the first electrode 102 and the second electrode 106 on the eggshell membrane 104 with the adhesive 122. At least a portion of the eggshell membrane 104 is exposed through the pores of the first electrode 102 and the second electrode 106.

Figure 4B:
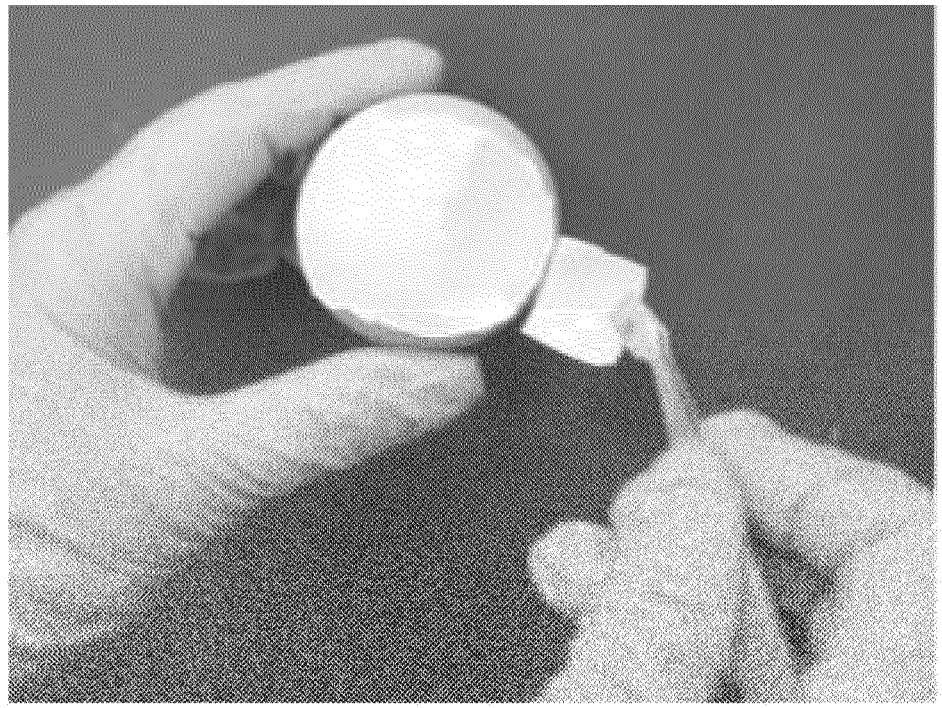
FIG. 4B shows an optical image of the first embodiment of a composite structure of an eggshell and an eggshell membrane.
Figure 5:
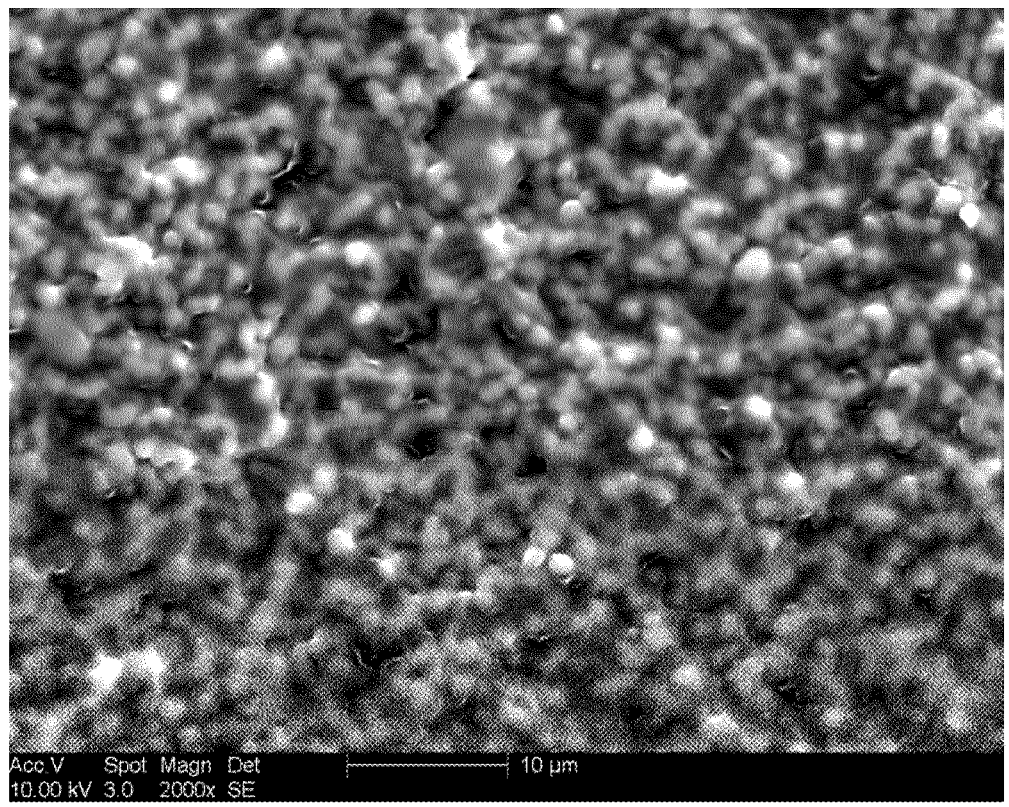
FIG. 5 shows a SEM image of the first embodiment of a surface of the eggshell membrane contacting with egg liquid.
Figure 6:
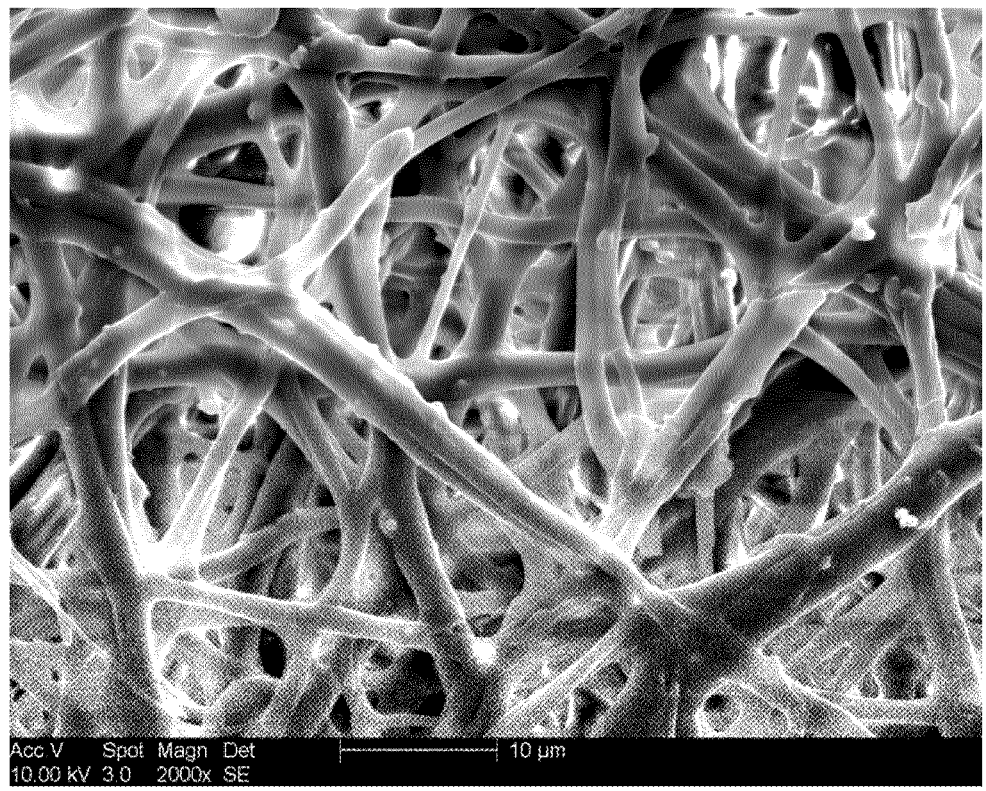
FIG. 6 shows a SEM image of the first embodiment of a surface of the eggshell membrane contacting with eggshell.

FIG. 4B shows an optical image of the composite structure of the eggshell 124 and the eggshell membrane 104. FIG. 5 shows the SEM image of a surface of the eggshell membrane 104 which was in contact with the egg liquid. FIG. 6 shows the SEM image of a surface of the eggshell membrane 104 which was in contact with the eggshell 124. As can be seen from FIG. 5 and FIG. 6, the eggshell membrane 104 has an interwoven microporous structure, and the surface of the eggshell membrane 104 in contact with the eggshell has a porous fiber structure. Thus, the eggshell membrane 104 has a higher porosity and a larger surface area, allowing diffusion of gas and liquid (such as water) molecules.

Figure 7:
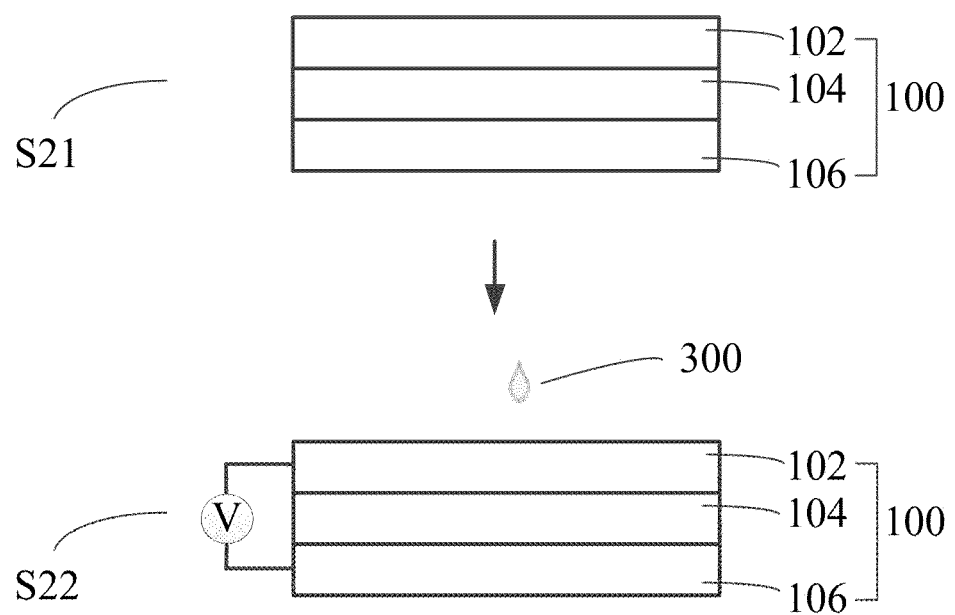
FIG. 7 is a process flow of a first embodiment of a method for generating electrical energy.

FIG. 7 shows a method for generating the electrical energy of the first embodiment, and the method includes one or more of the following steps:

S21, providing the electrical energy generating element 100; and

S22, allowing a liquid 300 having positive ions and negative ions to penetrate the electrical energy generating element 100 from the first electrode 102 to the second electrode 106.

During step S21, the liquid 300 is not limited, such as potassium chloride solution, sodium chloride solution, or water. The positive ions can be hydrogen ions, sodium ions, magnesium ions, potassium ions, and so on. The negative ions can be chloride ions, hydroxide ions, hypochlorite ions, carbonate ions, and so on. In one embodiment, the liquid 300 is tap water.

During step S22, the allowing the liquid 300 to penetrate the electrical energy generating element 100 includes:

S221, placing the liquid 300 on a side of the first electrode 102 away from the eggshell membrane 104;

S222, making the liquid 300 contact with the surface of the first electrode 102 away from the eggshell membrane 104; and S223, making the liquid 300 gradually penetrate from the surface of the first electrode 102 away from the eggshell membrane 104 to the surface of the second electrode 106 away from the eggshell membrane 104.

Furthermore, a voltmeter is provided to measure the electrical energy. The voltmeter is connected between the first electrode 102 and the second electrode 106. When the liquid 300 penetrates from the first electrode 102 to the eggshell membrane 104 and the second electrode 106, the first electrode 102 is connected to the negative electrode of the voltmeter, and the second electrode 106 is connected to the positive electrode of the voltmeter. When the liquid 300 penetrates from the second electrode 106 to the eggshell membrane 104 and the first electrode 102, the first electrode 102 is connected to the positive electrode of the voltmeter, and the second electrode 106 is connected to the negative electrode of the voltmeter. In one embodiment, the first electrode 102 is located above the eggshell membrane 104, the second electrode 106 is located below the eggshell membrane 104; the liquid 300 penetrates from the first electrode 102 to the second electrode 106 by gravity pull; and the first electrode 102 is connected to the negative electrode of the voltmeter, and the second electrode 106 is connected to the positive electrode of the voltmeter. The voltage value can be obtained from the voltmeter.

Figure 8:
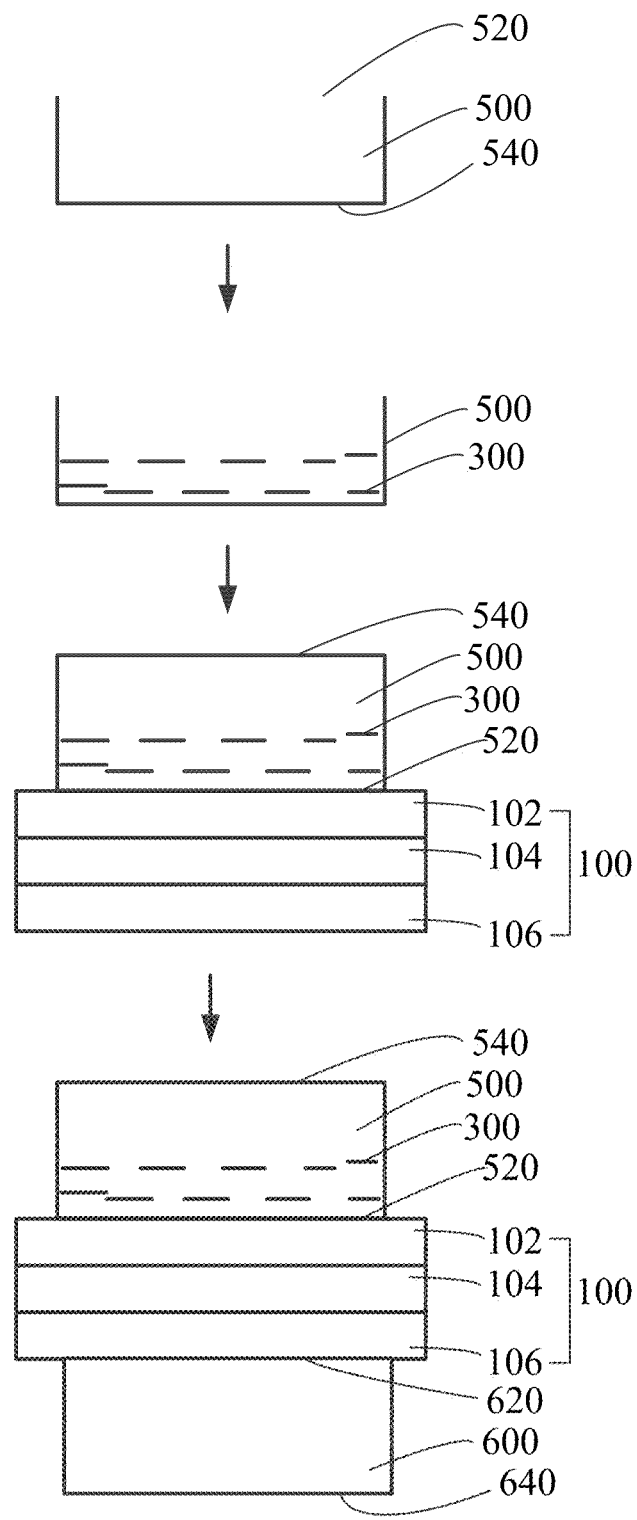
FIG. 8 is another process flow of the first embodiment of a method for generating electrical energy.

Furthermore, the allowing the liquid 300 to penetrate the electrical energy generating element 100 includes placing the liquid 300 in a first container 500 having a first opening 520 and a first bottom 540 opposite to the first opening 520. As shown in FIG. 8, the liquid 300 is first placed in the first container 500, and then the first container 500 containing the liquid 300 is tilted or inverted after the electrical energy generating element 100 covers the first opening 520. In one embodiment, the size of the first electrode 102 is greater than the size of the first opening 520, so that a portion of the first electrode 102 and a portion of the second electrode 106 are exposed and protruding along a direction away from the first container 500. The exposed portion of the first electrode 102 and the exposed portion of the second electrode 106 can be used to connect to an external load or circuit. In one embodiment, the first electrode 102 is in direct contact with the first opening 520.

Furthermore, the method for generating the electrical energy can include collecting the liquid 300 by a second container 600 having a second opening 620 and a second bottom 640 opposite to the second opening 620 after the liquid 300 penetrates the electrical energy generating element 100. As shown in FIG. 8, the electrical energy generating element 100 covers the second opening 620. In one embodiment, the size of the second electrode 106 is greater than the size of the second opening 620, so that a portion of the first electrode 102 and a portion of the second electrode 106 are exposed and protruding along the direction away from the second container 600. The exposed portion of the first electrode 102 and the exposed portion of the second electrode 106 can be used to connect to an external load or circuit.

Furthermore, the method for generating the electrical energy can include vibrating the first container 500. When the voltage value of the voltmeter stops rising and substantially does not change, the first container 500 is vibrated. In one embodiment, the first container 500 is tapped, so that the generated voltage can continue to rise.

The following are specific examples.

Example 1

The CNT/PANI composite structure is cut into a shape as shown in FIG. 9 by a laser, to obtain a CNT/PANI composite paper. The area of the overlapping region 105 is about $1.5 \times 1.5$ cm$^2$. The strip with a length of about 2.5 cm is used for connecting to the voltmeter. The eggshell membrane 104 is cut into a square with $1.7 \times 1.7$ cm$^2$. The eggshell membrane 104 and two CNT/PANI composite papers are stacked on each other to form a sandwich structure, wherein the eggshell membrane 104 is between the two CNT/PANI composite papers. The eggshell membrane 104 covers entire overlapping region 105, thus the two CNT/PANI composite papers are insulated from each other by the eggshell membrane 104, thereby avoiding a short circuit.

Figure 10:
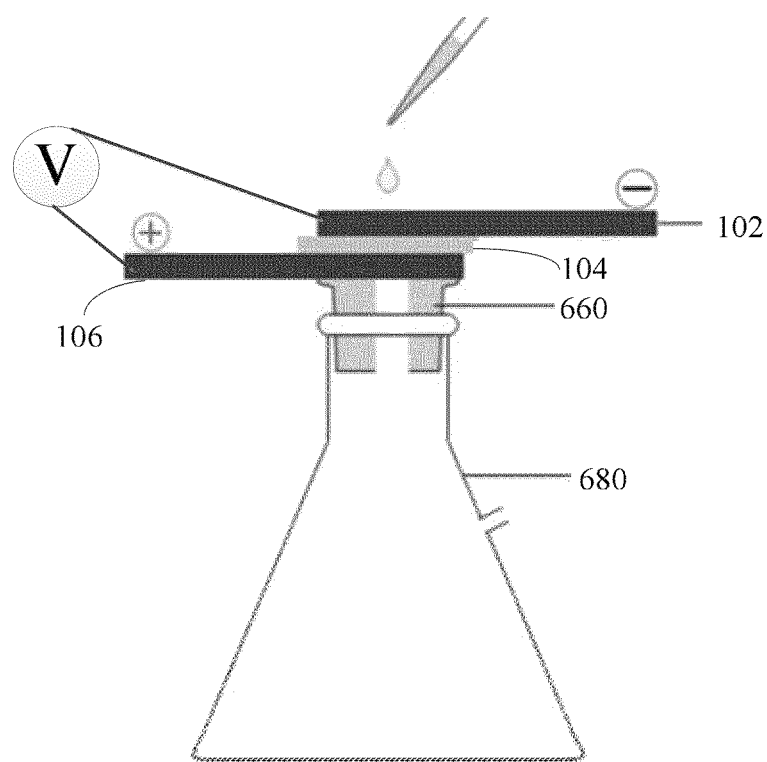
FIG. 10 shows a schematic view of a first embodiment of a composite structure of a filter flask and the electrical energy generating element that is formed by the CNT/PANI composite structure and the eggshell membrane.

As shown in FIG. 10, the sandwich structure shown is fixed to a cork 660 having a through hole, and the sandwich structure covers the through hole. The cork 660 is inserted into the opening of a filter flask 680. The water is dripped above the sandwich structure, and the open circuit voltage between the two CNT/PANI composite papers is measured using the voltmeter. The upper CNT/PANI composite paper is connected to the negative electrode of the voltmeter, and the lower CNT/PANI composite paper is connected to the positive electrode of the voltmeter. The amount of the water per drop is 20 microliter (μL).

Figure 11:
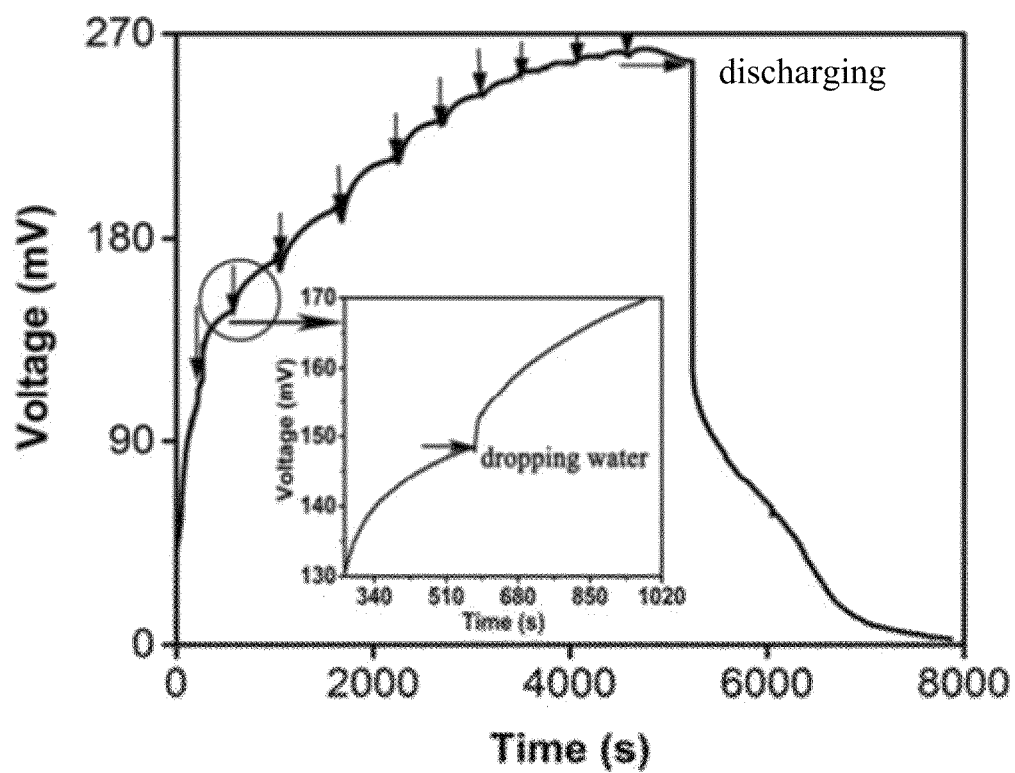
FIG. 11 is a diagrams of voltage vs. time of the first embodiment of the electrical energy generating element of the FIG. 10.

FIG. 11 shows the test results of the open circuit voltage of the sandwich structure. In FIG. 11, each arrow represents dripping water, when the water is dropped and penetrates the sandwich structure, voltage is generated. The inserted image of the FIG. 11 is an enlarged view, and shows that each dripping of water drops results in a voltage increase. Thus, the electrical energy can be stored in the sandwich structure. In the period of 0 to 5000 seconds, the open circuit voltage can reach 0.26V by continuously dripping water. At about 5000 seconds, the sandwich structure is connected to a 500 ohm load for discharge testing. As shown in FIG. 11, in the period of 0 to 5000 seconds, the water is continuously dripped, and the voltage gradually increases; at about 5000 seconds, the voltage decreases sharply. It can be seen that the sandwich structure is discharged when the sandwich structure is connected to a load of 500 ohm. Thus, the electrical energy stored by the sandwich structure can be released. The above experiments show that dripping water on the sandwich structure can generate electrical energy, the sandwich structure can obtain an ideal open circuit voltage by continuously dripping water, and the electrical energy can be stored and released.

The mechanism of generating electrical energy is explained below.

The eggshell membrane 104 has a relatively high porosity, and the first electrode 102 and the second electrode 106 are also porous, allowing diffusion of water molecules. The eggshell membrane 104 has an inherent selective permeability to specific positive ions in the water, and the negative ions of the water cannot pass through the eggshell membrane 104. Thus, when water is dripped on the first electrode 102 which is located above the eggshell membrane 104, water penetrates into the eggshell membrane 104 under gravity pull. The positive ions of the water pass through the eggshell membrane 104 and are gathered on the second electrode 106. The negative ions of the water cannot pass through the eggshell membrane 104 and are gathered on the first electrode 102. Thus, a potential difference between the first electrode 102 and the second electrode 106 is formed, and the electrical energy is stored on the first electrode 102 and the second electrode 106.

When the potential difference is formed, the positive ions of the water pass through the eggshell membrane 104 until an electrochemical equilibrium is established. The rising speed of the output voltage plateaued as time goes by, until another drop of water is added to destroy the electrochemical equilibrium, so that the output voltage rises rapidly again. In one embodiment, the maximum output voltage of the electrical energy generating element 100 is about 260 millivolts (mV). When the liquid 300 penetrates the eggshell membrane 104 from the first electrode 102 to the second electrode 106, the first electrode 102 gathers the negative ions of the liquid 300, and the second electrode 106 gathers the positive ions of the liquid 300. When the liquid 300 penetrates into the eggshell membrane 104 from the second electrode 106 to the first electrode 102, the second electrode 106 gathers the negative ions of the liquid 300, and the first electrode 102 gathers the positive ions of the liquid 300.

Figure 12:
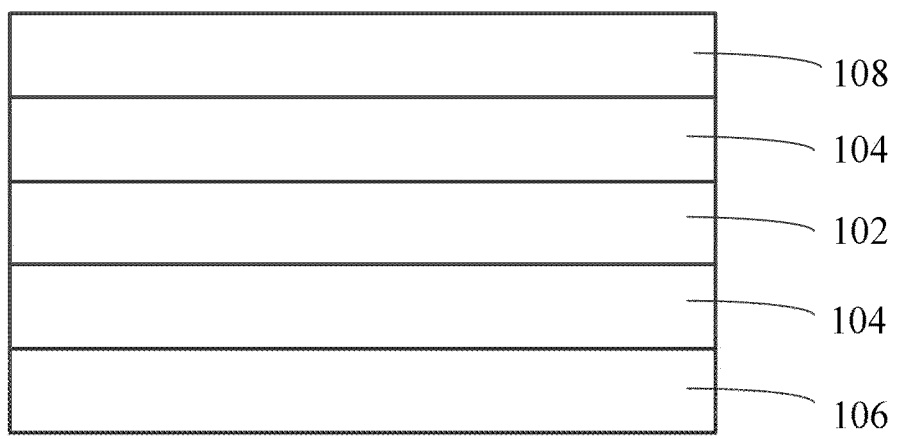
FIG. 12 shows a schematic view of a second embodiment of an electrical energy generating element.

FIG. 12 shows an electrical energy generating element 200 of a second embodiment. The electrical energy generating element 200 of the second embodiment is similar to the electrical energy generating element 100 of the first embodiment above except that the electrical energy generating element 200 includes two eggshell membranes 104 and further includes a third electrode 108.

The third electrode 108 is located on a side of the first electrode 102 away from the second electrode 106, and another eggshell membrane 104 is between the third electrode 108 and the first electrode 102. In one embodiment, both the third electrode 108 and the first electrode 102 are in direct contact with the eggshell membrane 104. In the electrical energy generating element 200, the third electrode 108, the eggshell membrane 104, the first electrode 102, another eggshell membrane 104, and the second electrode 106 are stacked on each other in that order. The third electrode 108 and the first electrode 102 are not electrically connected to each other due to the eggshell membrane 104 being disposed, and the first electrode 102 and the second electrode 106 are not electrically connected to each other due to the eggshell membrane 104 being disposed. The overlapping portion of the third electrode 108 and the first electrode 102 is also defined as the overlapping region 105. In one embodiment, the area (or size) of the eggshell membrane 104 between the third electrode 108 and the first electrode 102 is greater than or equal to the area (or size) of the overlapping region 105, so that the third electrode 108 and the first electrode 102 are spaced apart from each other. The material of the third electrode 108 is the same as that of the first electrode 102 and the second electrode 106. In one embodiment, the third electrode 108 is also the CNT/PANI composite structure.

When the liquid 300 penetrates the entire electrical energy generating element 200 from the third electrode 108 to the second electrode 106, the voltage between the third electrode 108 and the first electrode 102, the voltage between the first electrode 102 and the second electrode 106, and the voltage between the third electrode 108 and the second electrode 106 can be detected. The voltage between the third electrode 108 and the second electrode 106 is greater than the voltage between the third electrode 108 and the first electrode 102. The voltage between the third electrode 108 and the second electrode 106 is greater than the voltage between the first electrode 102 and the second electrode 106.

Figure 13:
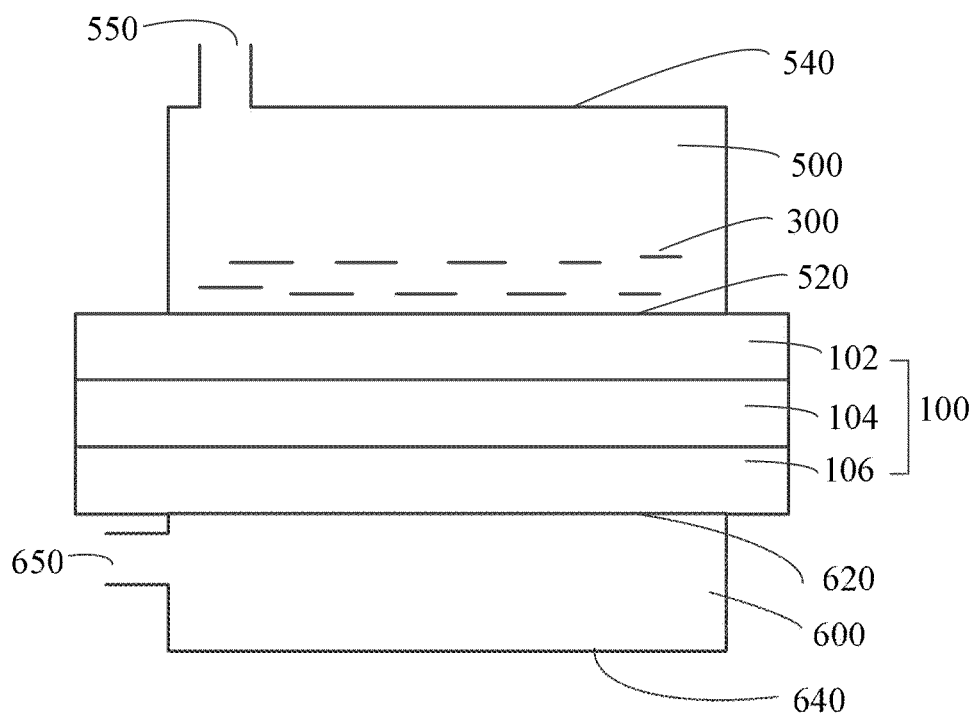
FIG. 13 shows a schematic view of a third embodiment of an electrical energy generating device.

FIG. 13 shows an electrical energy generating device 10 of a third embodiment. The electrical energy generating device 10 of the third embodiment includes the electrical energy generating element 100, the first container 500, and the second container 600. The electrical energy generating element 100 is between the first container 500 and the second container 600.

In the electrical energy generating device 10, the first container 500, the electrical energy generating element 100, and the second container 600 are located in that order. The first container 500 is in contact with the first electrode 102, and the first electrode 102 covers the first opening 520 of the first container 500. The first bottom 540 of the first container 500 is away from and opposite to the first electrode 102. The second container 600 is in contact with the second electrode 106, and the second electrode 106 covers the second opening 620 of the second container 600. The second bottom 640 of the second container 600 is away from and opposite to the second electrode 106. The first container 500 is configured for holding the liquid 300. The second container 600 is configured for collecting the liquid 300 penetrated from the electrical energy generating element 100.

Furthermore, the first bottom 540 of the first container 500 defines a first through hole 550. The liquid 300 can flow into the first container 500 through the first through hole 550. After the liquid 300 flows into the first container 500, the first through hole 550 can be plugged or sealed, or connected to input air to create a pressure in the first container 500. The materials of the first container 500 and the second container 600 are not limited, such as, plastic, polymer, glass, or the like.

Furthermore, the sidewall of the second container 600 can define a second through hole 650. The second container 600 can be evacuated through the second through hole 650 by a vacuum pump. When the second container 600 is evacuated and/or the first container 500 is under a positive pressure, the liquid 300 in the first container 500 is facilitated to penetrate the eggshell membrane 104 from the first electrode 102 to the second electrode 106. Conversely, when the liquid 300 penetrates the electrical energy generating element 100 from the second container 600 to the first container 500, the first container 500 can be evacuated through the first through hole 550 by the vacuum pump.

Example 2

Figure 14:
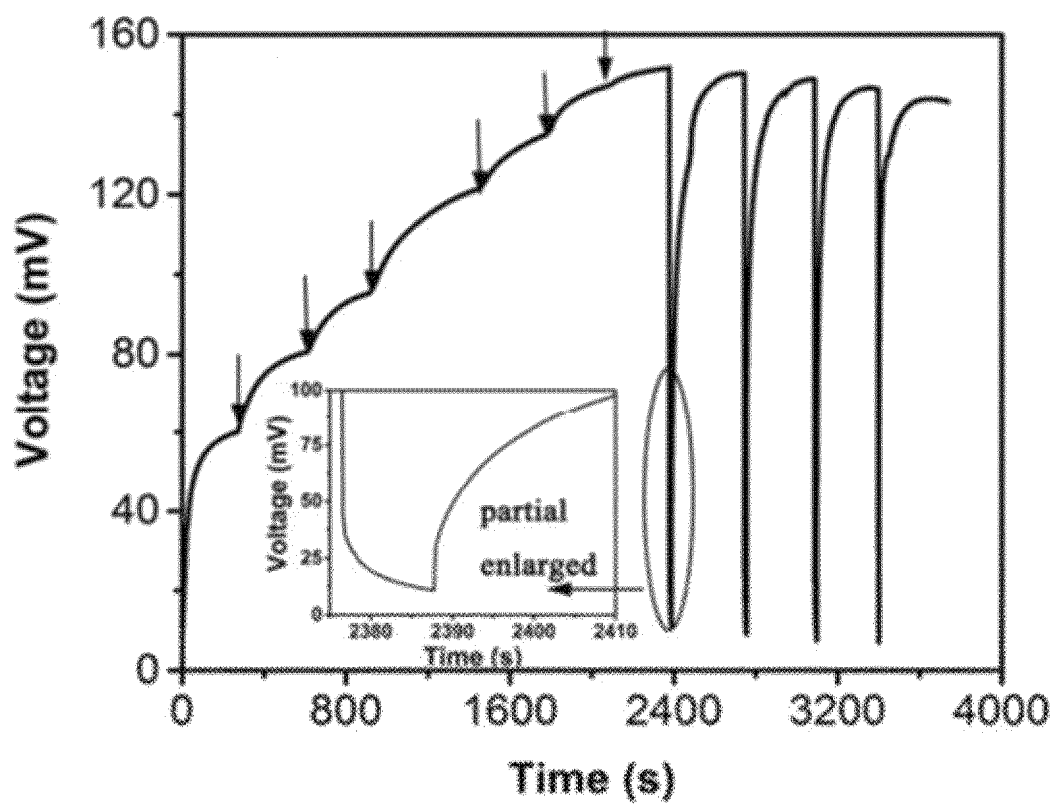
FIG. 14 is a diagrams of voltage vs. time of the electrical energy generating device of FIG. 13.

A plastic centrifuge tube with a diameter of 1 cm is cut into a first tube and a second tube. The two opposite ends of first tube open, and one end of the second tube opens. The sandwich structure of the example 1 is placed on the second tube, and the first tube is placed on the sandwich structure, and the sandwich structure is between the second tube and the first tube. Then AB glue can be placed between the sandwich structure and the first tube, and between the sandwich structure and the second tube. Thus, the sandwich structure, the first tube, and the second tube form a sealing structure. The voltmeter is connected between the two CNT/PANI composite papers. The CNT/PANI composite paper above the eggshell membrane 104 is electrically connected to the negative electrode of the voltmeter, and the CNT/PANI composite paper below the eggshell membrane 104 is electrically connected to the positive electrode of the voltmeter. The water is added to the first tube, and the amount of the water per drop is still 20 μL. The open circuit voltage between the two CNT/PANI composite papers is measured. As shown in FIG. 14, the arrow represents dripping water, the dripping water can generate the electric energy, and dripping water also accelerate the rise of electric potential.

The charge and discharge performance of the electrical energy generating device 10 is tested. The electrical energy generating device 10 is connected to a load of 100 ohm to discharge for 15 seconds, then the load is disconnected, and the electrical energy generating device 10 is recharged by dripping water to the first tube. The inserted image of the FIG. 14 is an enlarged view, and it can be seen that after discharging, the electrical energy generating device 10 can continue to recharge, and the voltage of the recharge is close to the original open circuit voltage. Thus, the electrical energy generating device 10 can be repeatedly utilized to realize cyclic charging and discharging.

Figure 15:
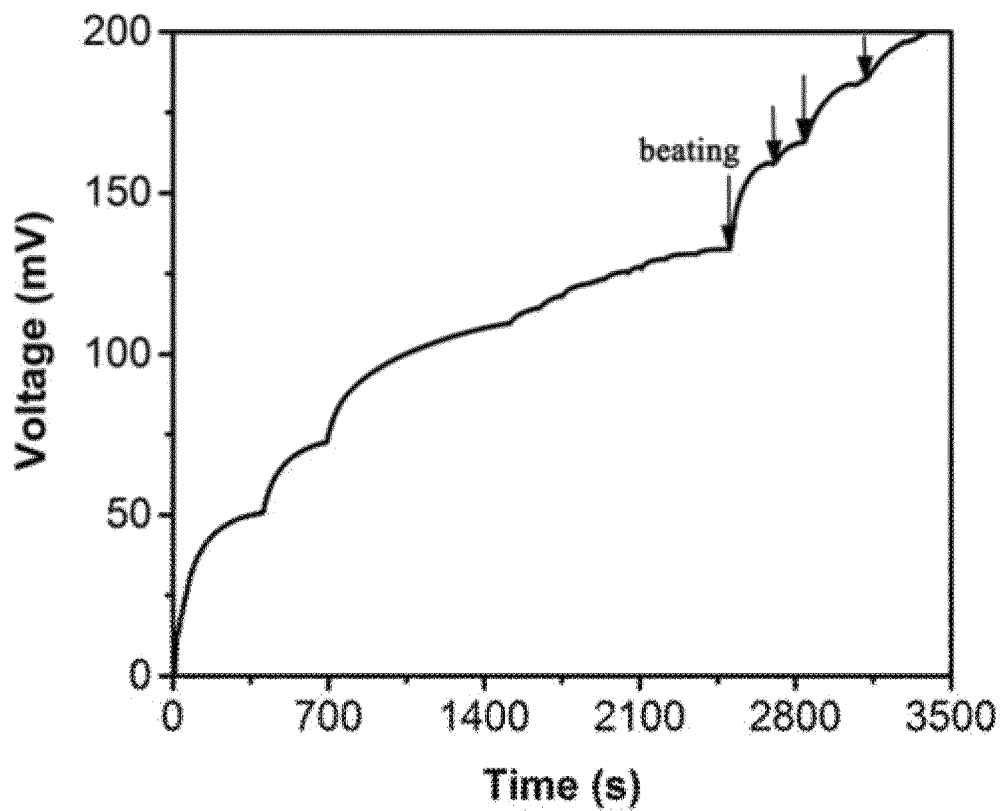
FIG. 15 is another diagrams of voltage vs. time of the electrical energy generating device of FIG. 13.

The water is continuously dripped into the first tube until the output voltage stops rising. Then the syringe needle taps the first tube at a rate of three times per second. In FIG. 15, the arrow represents beating the first tube. It can be seen from FIG. 15 that the external vibration or disturbance causes the output voltage of the electrical energy generating device 10 to rise rather than to decrease. Thus, vibration or disturbance can oscillate the water in the first tube, to break the electrochemical equilibrium. Thus, the positive ions of water continue to penetrate the eggshell membrane 104, thereby allowing the electrical energy generating device 10 to reach a larger open circuit voltage.

The electrical energy generating device 10 has the following characteristics: 1) when the first container 500 is located above the electrical energy generating element 100, the second container 600 is located below the electrical energy generating element 100, the liquid 300 in the first container 500 penetrates the electrical energy generating element 100 to enter the second container 600, thereby generating the voltage; 2) after the liquid 300 is diffused into the second container 600, the entire electrical energy generating device 10 can be inverted, so that the second container 600 is above the electrical energy generating element 100, the liquid 300 in the second container 600 can penetrate the electrical energy generating element 100 to enter the first container 500, thereby continuing to generate the voltage; 3) when liquid 300 is in the first container 500, the second container 600 can be evacuated through the second through hole 650, facilitating the liquid 300 in the first container 500 to diffuse through the eggshell membrane 104 from the first electrode 102 to the second electrode 106, thereby generate the voltage; 4) after all the liquid 300 is diffused into the second container 600, the first container 500 can be evacuated through the first through hole 550, facilitating the liquid 300 in the second container 600 to penetrate the eggshell membrane 104 from the second electrode 106 to the first electrode 102, thereby continuing to generate the voltage. Thus, the electrical energy generating device 10 can be repeatedly utilized. When the first container 500 or the second container 600 is evacuated, it is necessary to control the degree of vacuum to ensure that the eggshell membrane 104 is not damaged.

Figure 16:
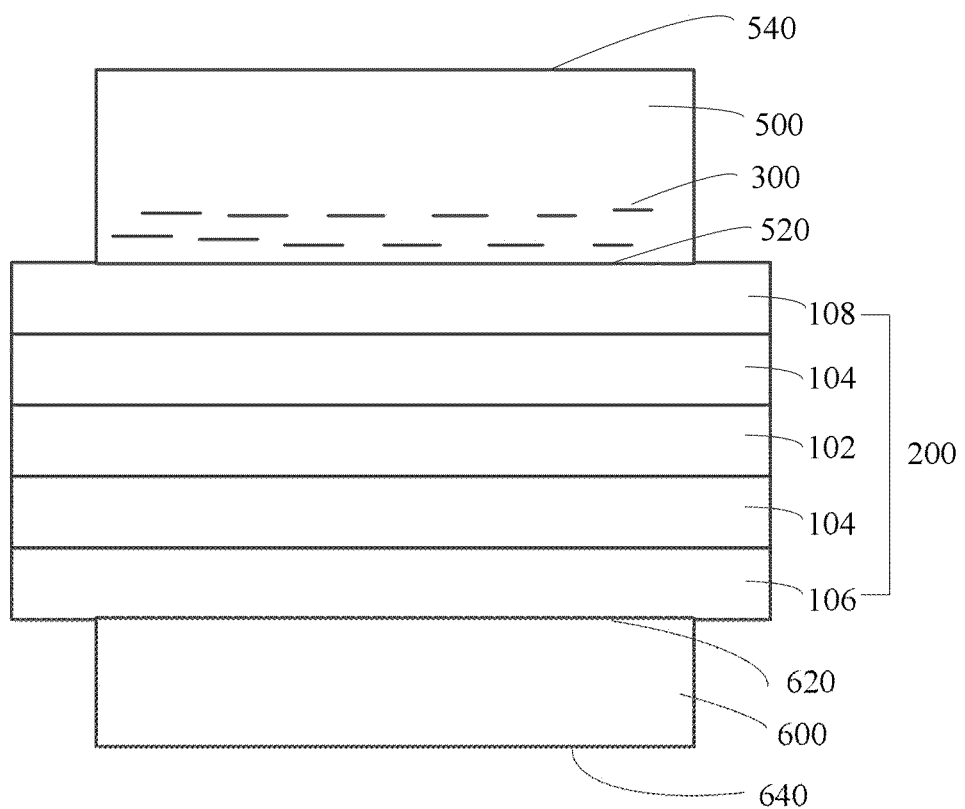
FIG. 16 shows a schematic view of a fourth embodiment of an electrical energy generating device.

FIG. 16 shows an electrical energy generating device 20 of a fourth embodiment. The electrical energy generating device 20 of the fourth embodiment includes the electrical energy generating element 200 of the second embodiment above, the first container 500, and the second container 600. The electrical energy generating element 200 is between the first container 500 and the second container 600.

In the electrical energy generating device 20, the first container 500, the electrical energy generating element 200, and the second container 600 are located in that order. The first container 500 is in contact with the third electrode 108, and the third electrode 108 covers the first opening 520 of the first container 500. The first bottom 540 of the first container 500 is away from and opposite to the third electrode 108. The second container 600 is in contact with the second electrode 106, and the second electrode 106 covers the second opening 620 of the second container 600. The second bottom 640 of the second container 600 is away from and opposite to the second electrode 106. The first container 500 is configured for holding the liquid 300. The second container 600 is configured for collecting the liquid 300 penetrated from the electrical energy generating element 200.

Furthermore, the first bottom 540 of the first container 500 can define a through hole (not show in FIG. 16). The liquid 300 can be placed into the first container 500 through the through hole. After placing the liquid 300 into the first container 500, the through hole is plugged or sealed.

Example 3

Figure 17:
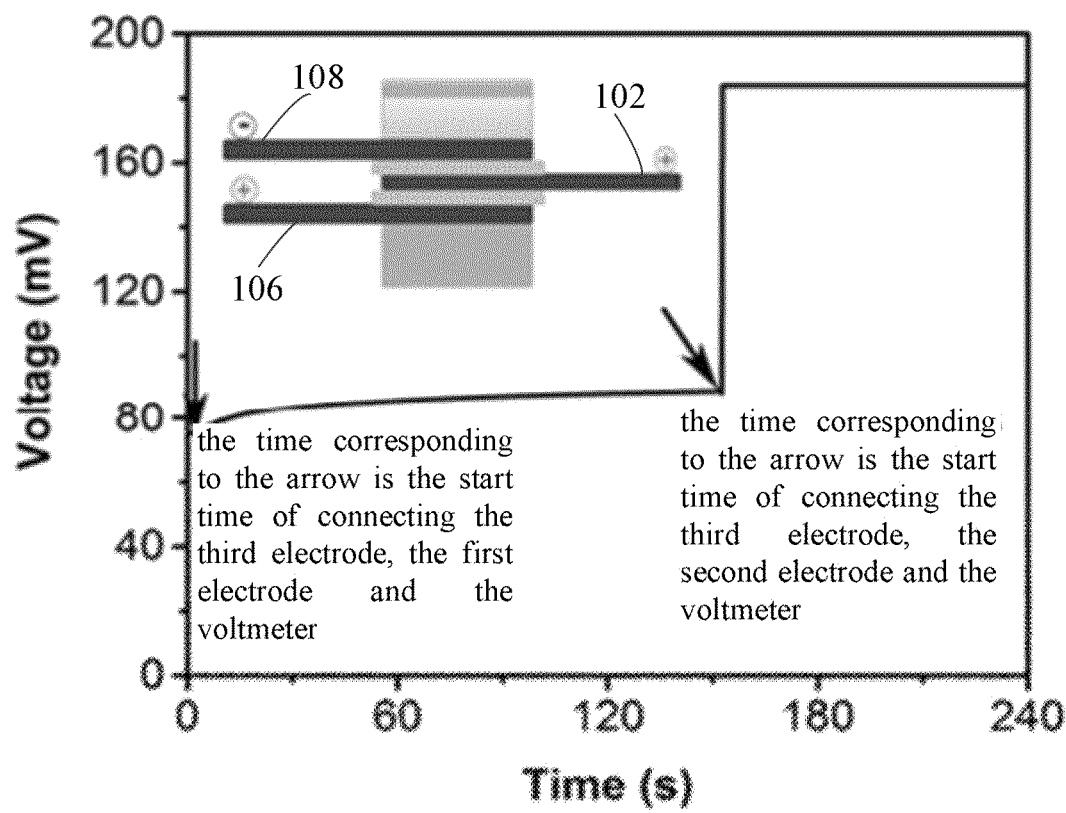
FIG. 17 is a diagrams of voltage vs. time of the electrical energy generating device of FIG. 16.

A plastic centrifuge tube with a diameter of 1 cm is cut into a first tube and a second tube. The two opposite ends of first tube open, and one end of the second tube opens. The electrical energy generating element 200 is placed on the second tube, and the first tube is placed on the electrical energy generating element 200, and the electrical energy generating element 200 is between the second tube and the first tube. Then the AB glue can be located between the electrical energy generating element 200 and the first tube, and between the electrical energy generating element 200 and the second tube. Thus, the electrical energy generating element 200, the first tube, and the second tube form a sealing structure. Water is added to the first tube, and the open circuit voltage of the electrical energy generating element 200 is measured. When the open circuit voltage between the third electrode 108 and the first electrode 102 is measured, the third electrode 108 is electrically connected to the negative electrode of the voltmeter, the first electrode 102 is electrically connected to the positive electrode of the voltmeter, and the open circuit voltage between the third electrode 108 and the first electrode 102 is about 130 mV. Then entire apparatus is allowed to stand for 5 hours, so that water can penetrate the eggshell membrane 104 below the first electrode 102. At the moment, the open circuit voltage of the apparatus is measured again. As shown in FIG. 17, the open circuit voltage between the third electrode 108 and the first electrode 102 is first measured and is about 90 mV, then the open circuit voltage between the third electrode 108 and the second electrode 106 is measured and is about 190 mV Thus, the two eggshell membranes 104 can make the electrical energy generating device 20 have larger open circuit voltage. Thus, increasing the number of the eggshell membrane 104 can obtain a desired voltage value, but it takes a longer time for the liquid 300 to penetrate each of the eggshell membranes 104.

Figure 18:
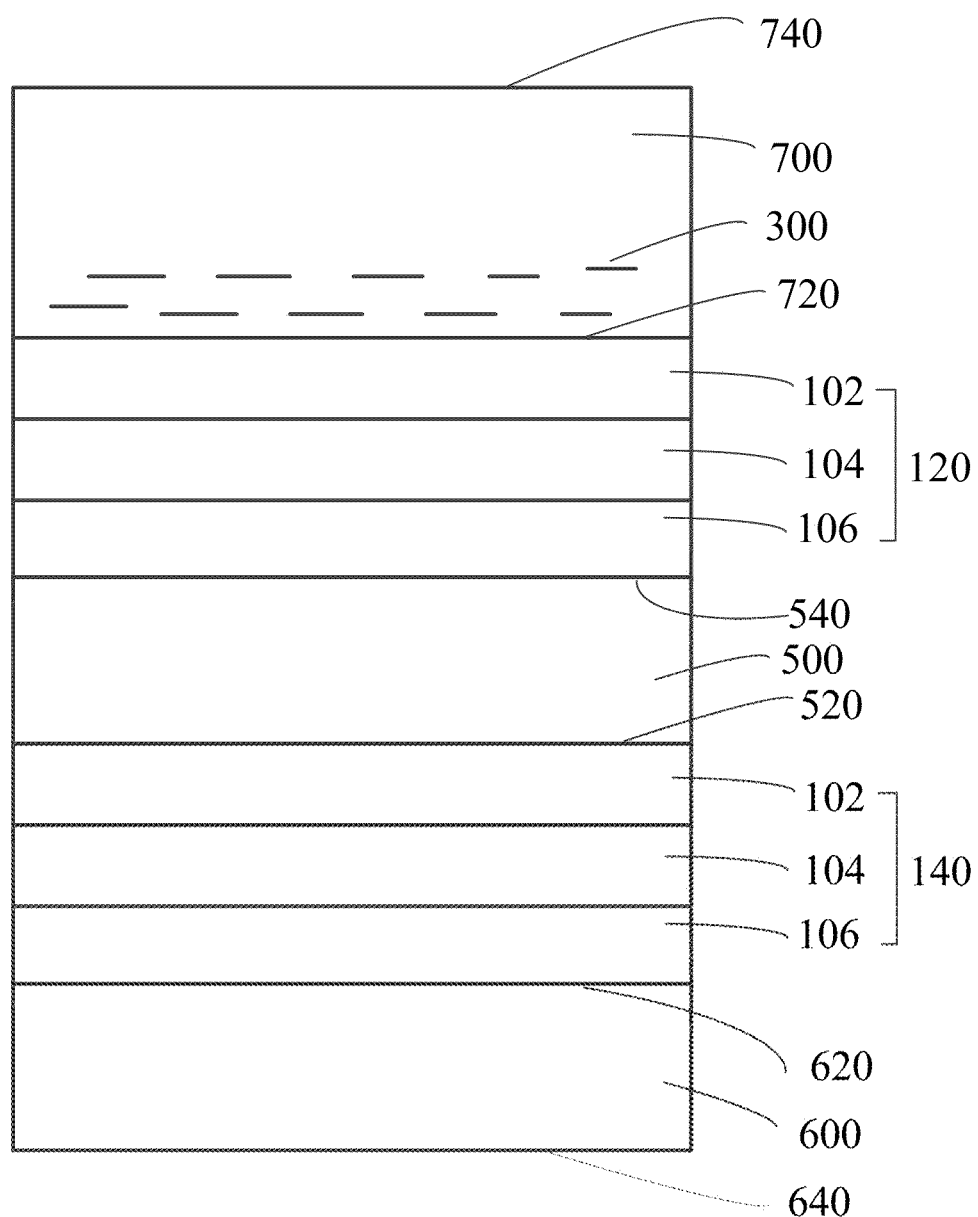
FIG. 18 shows a schematic view of a fifth embodiment of an electrical energy generating device.

FIG. 18 shows an electrical energy generating device 30 of a fifth embodiment. The electrical energy generating device 30 of the fifth embodiment is similar to the electrical energy generating device 10 of the third embodiment above except that the electrical energy generating device 30 further includes another electrical energy generating element 100 and a third container 700. The electrical energy generating device 30 includes two electrical energy generating elements 100. The two electrical energy generating elements 100 are defined as a first electrical energy generating element 120 and a second electrical energy generating element 140.

In the electrical energy generating device 30, the third container 700, the first electrical energy generating element 120, the first container 500, the second electrical energy generating element 140, and the second container 600 are located in that order. The through hole of the first bottom 540 are not plugged or sealed so that the first bottom 540 of the first container 500 is in an open state. The third container 700 has a third opening 720 and a third bottom 740 opposite to the third opening 720. The first electrode 102 of the first electrical energy generating element 120 covers the third opening 720, and is opposite to the third bottom 740. The third bottom 740 can define a through hole (not show in FIG. 18). The liquid 300 can be placed into the third container 700 through the through hole. After placing the liquid 300 into the third container 700, the through hole is plugged or sealed. The third container 700 is configured for holding the liquid 300. The second container 600 is configured for collecting the liquid 300 penetrated from the second electrical energy generating element 140.

The material of the third container 700 is not limited. In one embodiment, the first container 500, the second container 600, and the third container 700 are made of the same material. In one embodiment, the third container 700, the first electrical energy generating element 120, the first container 500, the second electrical energy generating element 140, and the second container 600 are located in that order from top to bottom. The electrical energy generating device 30 is composed of two electrical energy generating devices 10.

Example 3

Figure 19:
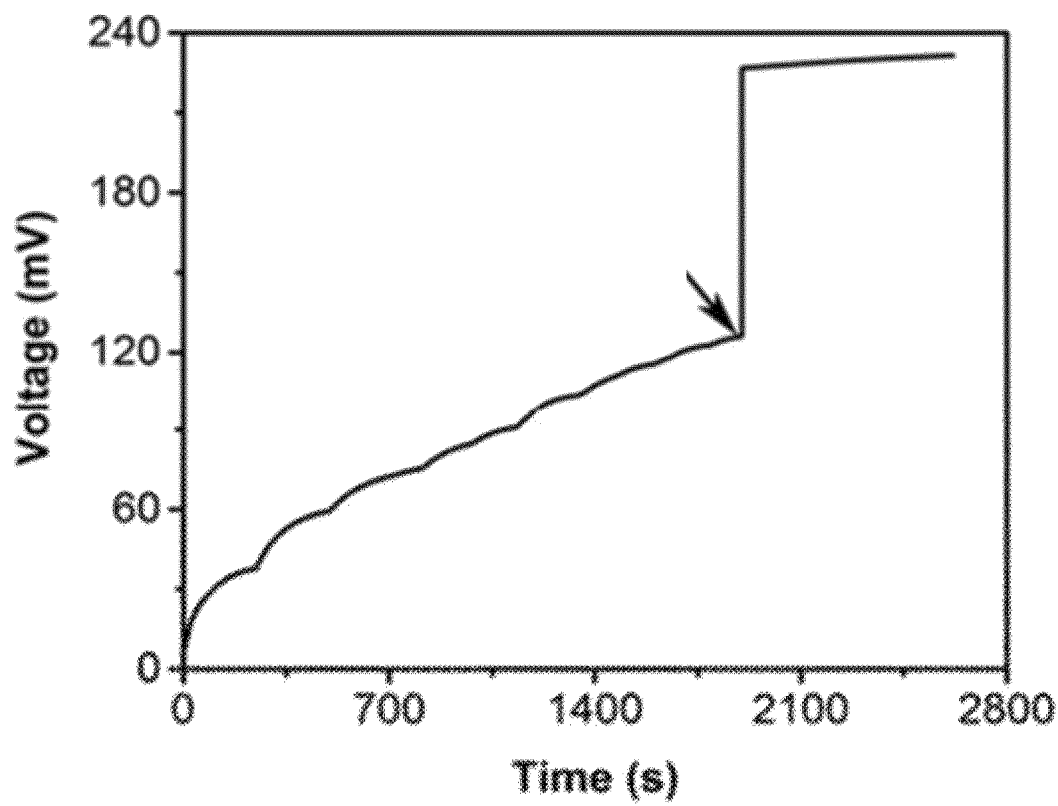
FIG. 19 is a diagrams of voltage vs. time of the electrical energy generating device of FIG. 18.

The first container 500, the second container 600, and the third container 700 are plastic centrifuge tubes with a diameter of 1 cm and a height of 1 cm. Each of the first electrode 102 and the second electrode 106 is the CNT/PANI composite structure. The water is dripped into the third container 700, and the open circuit voltage between the first electrode 102 and the second electrode 106 of the first electrical energy generating element 120 is measured. When the open circuit voltage between the first electrode 102 and the second electrode 106 of the first electrical energy generating element 120 is stable, the switch between the second electrode 106 of the first electrical energy generating element 120 and the first electrode 102 of the second electrical energy generating element 140 (not shown in FIG. 18) is closed, and the open circuit voltage between the first electrode 102 of the first electrical energy generating element 120 and the second electrode 104 of the second electrical energy generating element 140 is measured. In FIG. 19, the time corresponding to the arrow is the time of start connecting the two electrical energy generating devices 10 in series. Thus, the two electrical energy generating devices 10 are connected in series and their open circuit voltage can be superimposed to achieve a larger value. When the two electrical energy generating devices 10 are connected in parallel, their open circuit current can be superimposed to achieve a larger value. The electrical energy generating devices 10, 20, 30 have the similar characteristics.

Figure 20:
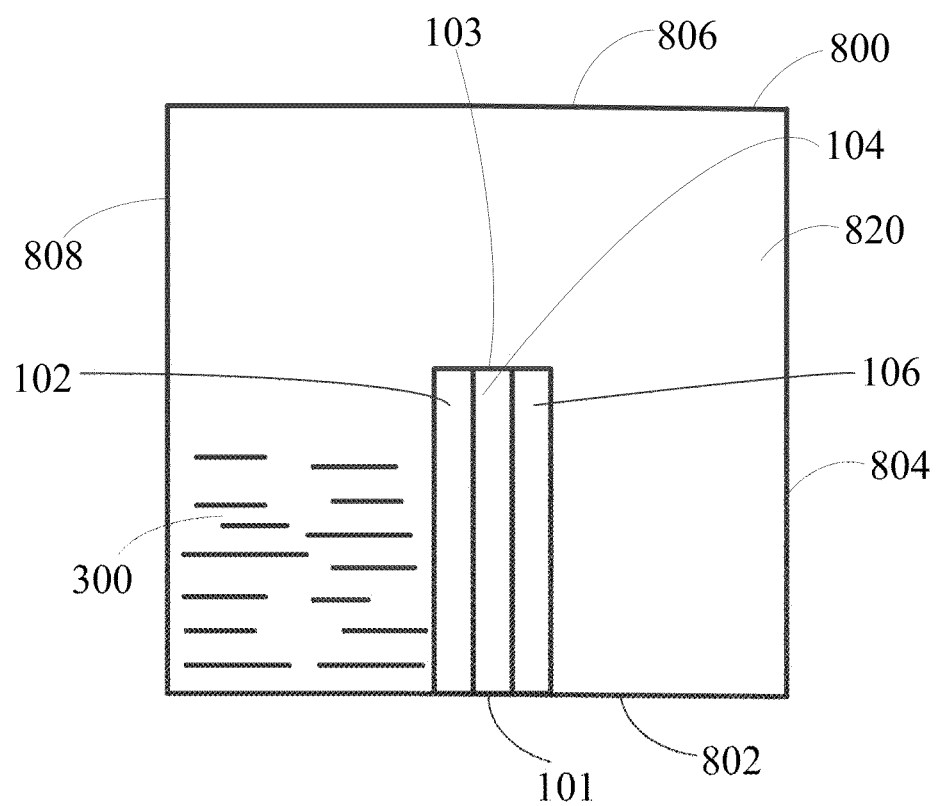
FIG. 20 shows a schematic view of a sixth embodiment of an electrical energy generating device.

FIG. 20 shows an electrical energy generating device 40 of a sixth embodiment. The electrical energy generating device 40 of the sixth embodiment includes the electrical energy generating element 100 of the first embodiment above and a fourth container 800. The electrical energy generating element 100 is located in the fourth container 800, and the liquid 300 is in the fourth container 800.

The fourth container 800 defines a space 820, and the electrical energy generating element 100 is in the space 820.

The electrical energy generating element 100 has a first side 101 and a second side 103 opposite to the first side 101. The first side 101 is fixed on and in direct contact with the sidewall of the fourth container 800. The second side 103 is suspended and spaced apart from the sidewall of the fourth container 800. In one embodiment, the fourth container 800 has a first sidewall 802, a second sidewall 804, a third sidewall 806 opposite to the first sidewall 802, and a fourth sidewall 808 opposite to the second sidewall 804. The first sidewall 802, the second sidewall 804, the third sidewall 806, and the fourth sidewall 808 enclose the space 820. The electrical energy generating element 100 is fixed on the first sidewall 802, the first side 101 is in direct contact with the first sidewall 802, and the second side 103 is spaced apart from the third sidewall 806. The electrical energy generating element 100 is spaced apart from the second sidewall 804 and the fourth sidewall 808, the first electrode 102 faces the fourth sidewall 808, and the second electrode 106 faces the second sidewall 804. In one embodiment, the first electrode 102 and the second electrode 106 extend out of the space 820 through the first sidewall 802 to be connected the external circuit. The material of the fourth container 800 is not limited. In one embodiment, the first container 500 and the fourth container 800 are made of the same material.

Figure 21:
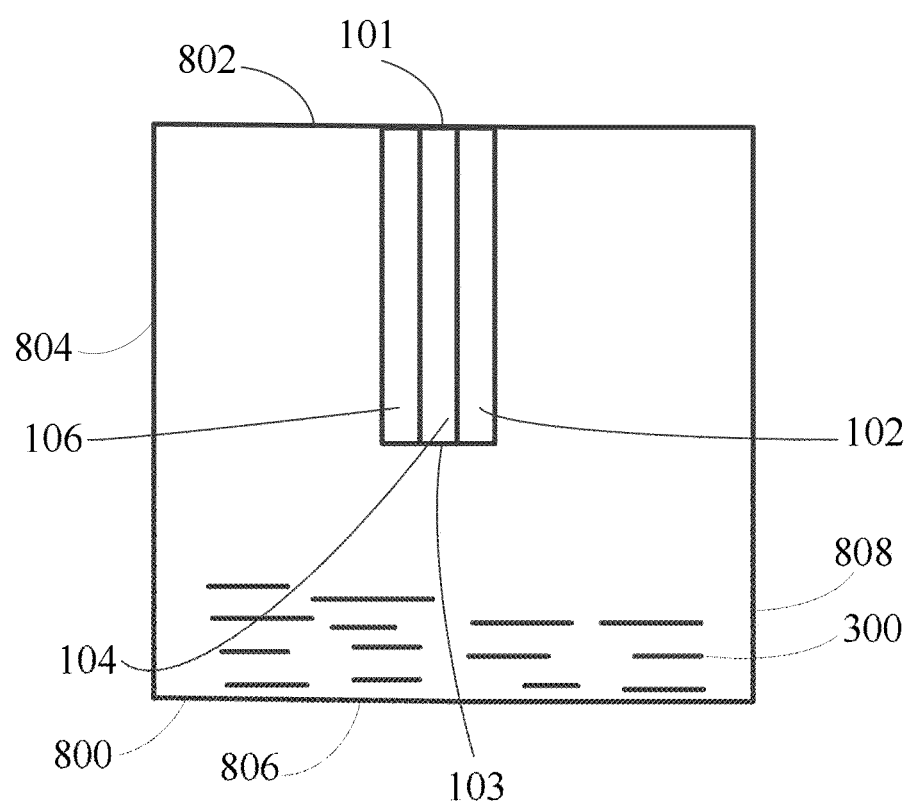
FIG. 21 shows a schematic view of another placement of the electrical energy generating device in FIG. 20.

In operation, as shown in FIG. 20, in one embodiment, the first sidewall 802 is below the third sidewall 806, and the liquid 300 is initially contained between the fourth sidewall 808 and the first electrode 102. The liquid 300 penetrates the eggshell membrane 104 from the first electrode 102 to the second electrode 106, so that the voltage is generated. Thus, the electrical energy generating device 40 works and can generate the electrical energy. As shown in FIG. 21, the electrical energy generating device 40 is turned upside down so that the first sidewall 802 is located above the third sidewall 806, and the liquid 300 flows onto the third sidewall 806. The height of the liquid 300 is small such that the electrical energy generating element 100 does not contact with the liquid 300. Thus, the first electrode 102 and the second electrode 106 do not contact with the liquid 300, and no voltage is generated. Thus, in such as state, the electrical energy generating device 40 does not function and cannot generate the electrical energy.

Figure 22:
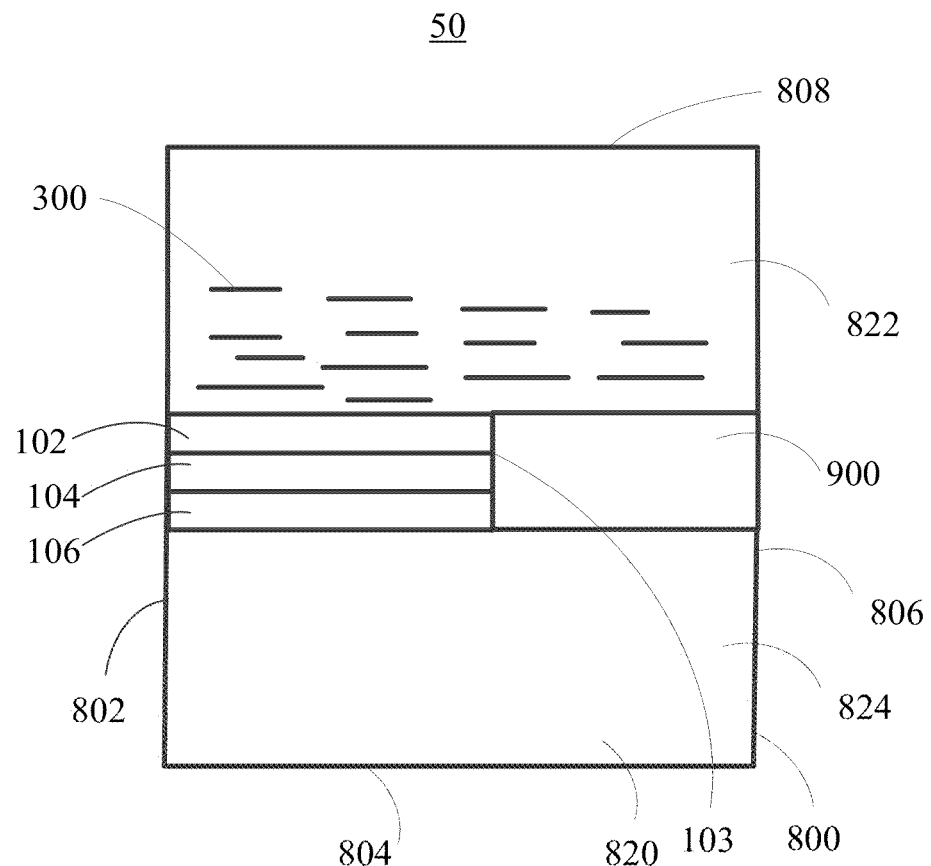
FIG. 22 shows a schematic view of a seventh embodiment of an electrical energy generating device.

FIG. 22 shows an electrical energy generating device 50 of a seventh embodiment. The electrical energy generating device 50 of the seventh embodiment is similar to the electrical energy generating device 40 of the sixth embodiment above except that the electrical energy generating device 50 further includes a water barrier film 900. The water barrier film 900 is between the second side 103 of the electrical energy generating element 100 and the third sidewall 806. The water barrier film 900 is in direct contact with the second side 103 and the third sidewall 806, so that the space 820 is divided into a first space 822 and a second space 824 separated from each other. The liquid 300 is in at least one of the first space 822 and the second space 824. When the first sidewall 802 is above the third sidewall 806, the electrical energy generating element 100 does not contact with the liquid 300. The material of the water barrier film 900 is not limited as long as the water barrier film 900 is impermeable to water. In one embodiment, the water barrier film 900 is made of glass, polymer or the like.

Figure 23:
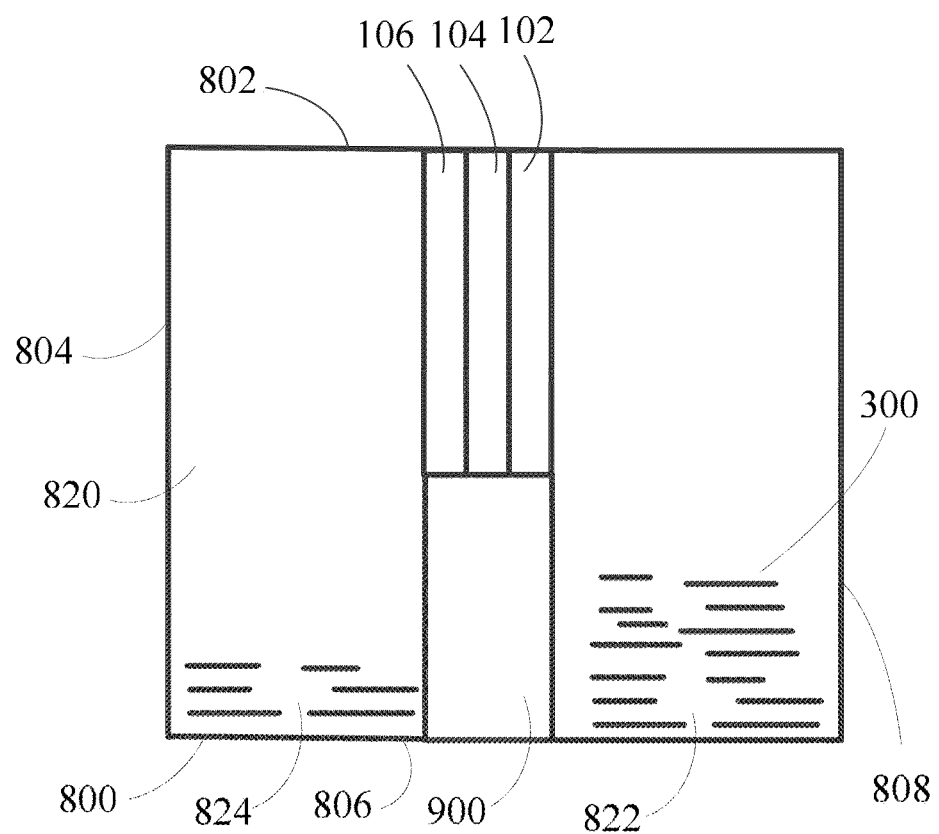
FIG. 23 shows a schematic view of another placement of the electrical energy generating device in FIG. 22.

In operation, as shown in FIG. 22, the second sidewall 804 is below the fourth sidewall 808, and the liquid 300 in the first space 822 penetrates the eggshell membrane 104 from the first electrode 102 to the second electrode 106, so that the voltage is generated. Thus, the electrical energy generating device 50 functions and can generate the electrical energy. As shown in FIG. 23, the electrical energy generating device 50 is turned upside down so that the first sidewall 802 is above the third sidewall 806, and the liquid 300 flows onto the third sidewall 806. The height of the liquid 300 is less than the height of the water barrier film 900 so that the electrical energy generating element 100 does not contact with the liquid 300. Thus, the first electrode 102 and the second electrode 106 do not contact with the liquid 300, and no voltage is generated in such a state. Thus, the electrical energy generating device 50 does not function and cannot generate the electrical energy. In addition, when the electrical energy generating device 50 is turned side way so that the second sidewall 804 and the fourth sidewall 808 are above the first sidewall 802, and the liquid 300 in the second space 824 can diffuse to the first space 822 via the electrical energy generating element 100, or vice versa. so that a voltage is generated. Thus, in such a sideway state, the electrical energy generating device 50 also functions and can generate electrical energy.

The electrical energy generating devices 40, 50 have the following characteristics: the electrical energy generating devices 40, 50 can be controlled to generate voltages or not to generate voltages by changing orientations of the electrical energy devices 40, and 50.

Figure 24:
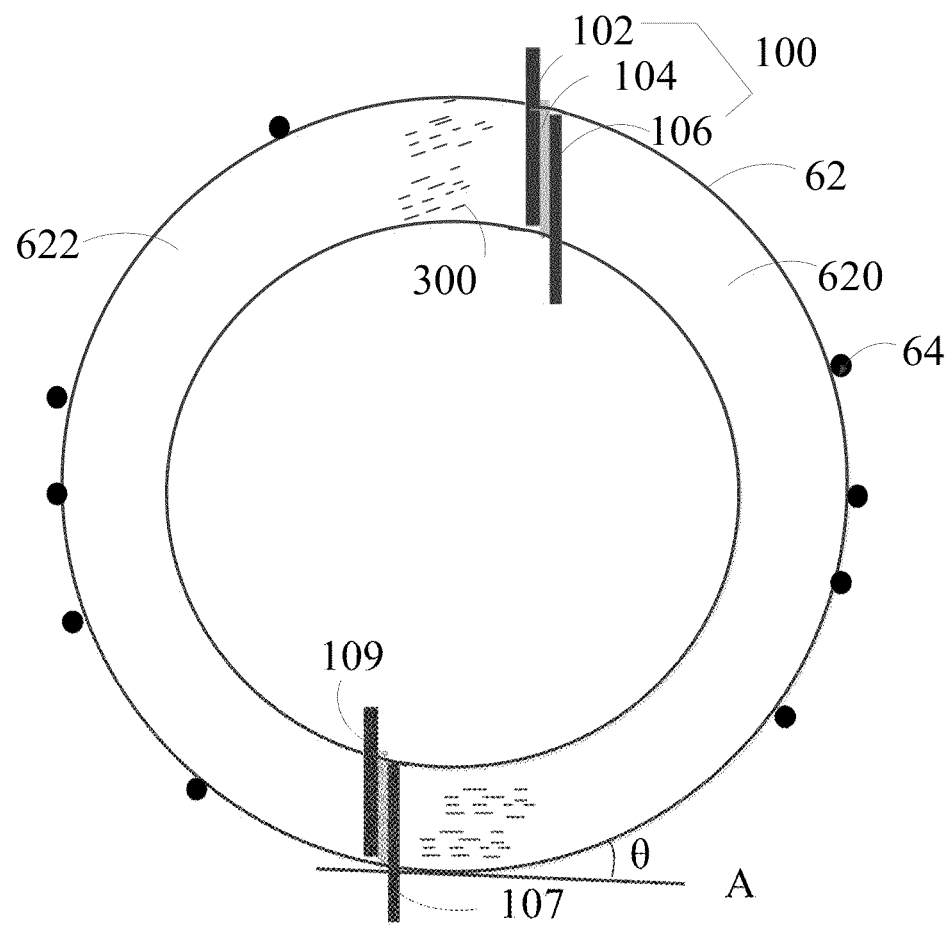
FIG. 24 shows a schematic view of an eighth embodiment of a decorative ring.

FIG. 24 shows a decorative ring 60 of an eighth embodiment. The decorative ring 60 includes a body 62, a plurality of electrical energy generating elements 100, a plurality of light emitting elements 64, and the liquid 300.

The body 62 has a hollow tubular structure and defines a body space 620. The body 62 can be an annular structure, so that the decorative ring 60 can be worn. The annular structure can be any shape, such as circle, triangle, square, polygon of N≥5, ellipse, or the like. The annular structure can be arranged in a closed ring shape or a non-closed ring shape.

The plurality of electrical energy generating elements 100 are located in the body space 620 and spaced apart from each other. The body space 620 is divided into a plurality of sub-body spaces 622 separated from each other. The plurality of light emitting elements 64 are located on the outer surface of the body 62 or embedded within the wall of the body 62. The plurality of electrical energy generating elements 100 are electrically connected to at least one of the plurality of light emitting elements 64. In one embodiment, the first electrode 102 and the second electrode 106 of each of the electrical energy generating elements 100 extend out of the body space 620 to electrically connect to one of the light emitting elements 64. The liquid 300 is in at least one of the plurality of sub-body spaces 622. However, the liquid 300 does not completely fill the body 62. The volume ratio of the liquid 300 to the body space 620 must be less than 1:1, for example, the liquid 300: the body space 620 (volume ratio)=1:2, the liquid 300: the body space 620 (volume ratio)=1:3, the liquid 300: the body space 620 (volume ratio)=1:4, or the like.

Each of the electrical energy generating elements 100 has a first surface 107 and a second surface 109 opposite to the first surface 107. The first surface 107 is the surface of the first electrode 102 away from the eggshell membrane 104, and the second surface 109 is the surface of the second electrode 106 away from the eggshell membrane 104. When one electrical energy generating element 100 is located in the body space 620, there is a tangent line A at the contact point between the electrical energy generating element 100 and the outer surface of the annular body 62, and an angle θ is defined between the first surface 107 of this electrical energy generating element 100 and the tangent line A of the annular body 62. The angle θ is greater than 0 degrees and less than or equal to about 90 degrees. The angle θ is also defined between the second surface 109 and the tangent line A of the annular body 62. In one embodiment, θ is greater than about 60 degrees and less than or equal to about 90 degrees. In one embodiment, θ is about 90 degrees. The number of the plurality of electrical energy generating elements 100 is not limited. In one embodiment, the number of the electrical energy generating element 100 is in a range from 2 to 6. The material of the body 62 can be, but not limited to, polymer, leather, glass, or the like. In one embodiment, the material of the body 62 is rubber. The type of the light emitting element 64 can be, but not limited to, light emitting diode (LED) or the like.

As the decorative ring 60 moves (for example, by a person wearing the decorative ring 60), the liquid 300 in the body space 622 can contact with the first electrode 102 (or the second electrode 106) and diffuses through the eggshell membrane 104 to generate the voltage. The voltage can power the light emitting elements 64 to emit light. During the movement of the decorative ring 60, the liquid 300 may not contact with the first electrode 102 and the second electrode 106, so that no voltage is generated and the light emitting elements 64 do not emit light. Thus, the light emitting elements 64 sometimes emit light and sometimes do not emit light. In use, people wearing the decorative rings 60 can be located because the light emitting elements 64 emit light. In other applications, the decorative ring 60 twinkles because the light emitting elements 64 emit light occasionally. The decorative ring 60 can be worn on by person or on an object.

Furthermore, the electrical energy generating element 100 of the decorative ring 60 can also be replaced with the electrical energy generating element 200. The light emitting elements 64 can be electrically connected between the third electrode 108 and the first electrode 102. The light emitting elements 64 can also be electrically connected between the third electrode 108 and the second electrode 106.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Additionally, it is also to be understood that the above description and the claims drawn to a method may comprise some indication in reference to certain steps. However, the indication used is only to be viewed for identification purposes and not as a suggestion as to an order for the steps.

What is claimed is:

1. A method for generating electrical energy, comprising:
providing an electrical energy generating element comprising a first porous electrode, an eggshell membrane, and a second porous electrode stacked on each other in that order, wherein the electrical energy generating element comprises a first side and a second side opposite to the first side, the first side is a side of the first porous electrode away from the eggshell membrane, and the second side is a side of the second porous electrode away from the eggshell membrane; and
facilitating a liquid to diffuse the from the first side to the second side, or vice versa, of electrical energy generating element; wherein the method of facilitating the liquid to diffuse from the first side to the second side comprises:
placing the liquid in a first container comprising a first opening and a first bottom opposite to the first opening;
arranging the electrical energy generating element to cover the first opening;
tilting or inverting the first container containing the liquid;
collecting the liquid in a second container after the liquid is diffused through the electrical energy generating element; and
inverting the electrical energy generating element to facilitate the liquid diffusing from the second container to the first container after the liquid is collected by the second container.

2. The method of claim 1, the method of facilitating the liquid to diffuse from the first side to the second side, or vice versa, comprises:
placing the liquid on the first side or the second side of the electrical energy generating element;
making the liquid contact with a surface of the first side or a surface of the second side; and
facilitating the liquid to diffuse from the surface of the first side to the surface of the second side, or vice versa.

3. The method of claim 2, further comprising selection a liquid comprising negative ions and positive ions, wherein during the liquid penetrates the electrical energy generating element, the negative ions are gathered on the first porous electrode, and the positive ions are gathered on the second porous electrode.

4. The method of claim 1, the method of facilitating the liquid to diffuse from the first side to the second side further comprising vibrating the first container.

5. The method of claim 1, wherein the method of facilitating the liquid to diffuse from the first side to the second side further comprises tapping the first container.

6. The method of claim 1, further comprising facilitating the liquid to diffuse between the first container and the second container by alternatively inverting the electrical energy generating element.

7. The method of claim 1, wherein the liquid is selected from a potassium chloride solution, a sodium chloride solution, or water.

8. The method of claim 1, the method of providing the electrical generating element comprising making each of the first porous electrode and the second porous electrode from a carbon nanotube film, a metal mesh, a porous metal sheet, or a composite structure of carbon nanotube and polyaniline.

9. The method of claim 8, the method of providing the electrical generating element further comprising:
providing the composite structure comprising a carbon nanotube network structure and a polyaniline layer coated on surfaces of the carbon nanotube network structure, wherein the carbon nanotube network structure comprises a plurality of carbon nanotubes disorderly arranged.

10. The method of claim 1, wherein the eggshell membrane is obtained from eggs, duck eggs, goose eggs, quail eggs, or bird eggs.

11. The method of claim 1 comprising:
providing a third porous electrode to the electrical energy generating element and a plurality of eggshell membranes, wherein the third porous electrode is arranged on a side of the first porous electrode away from the eggshell membrane between the first and the second porous electrodes, and one of the eggshell membranes is arranged between the third porous electrode and the first porous electrode.

12. A method for generating electrical energy, comprising:
providing an electrical energy generating element comprising a first porous electrode, an eggshell membrane, and a second porous electrode stacked on each other in that order, wherein the electrical energy generating element comprises a first side and a second side opposite to the first side, the first side is a side of the first porous electrode away from the eggshell membrane, and the second side is a side of the second porous electrode away from the eggshell membrane; and
locating the electrical energy generating element between a first container and a second container, so that a surface of the first side covers an opening of the first container, and a surface of the second side covers an opening of the second container; and
facilitating a liquid to diffuse between the first container and the second container by alternatively inverting the electrical energy generating element, so that the liquid is diffused from the first side to the second side, or vice versa, of electrical energy generating element.

13. The method of claim 12, wherein the liquid is selected from a potassium chloride solution, a sodium chloride solution, or water.

14. The method of claim 12, wherein each of the first porous electrode and the second porous electrode is a carbon nanotube film, a metal mesh, a porous metal sheet, or a composite structure of carbon nanotube and polyaniline.

15. The method of claim 14, wherein the method of providing the electrical generating element comprises:
providing the composite structure comprising a carbon nanotube network structure and a polyaniline layer coated on surfaces of the carbon nanotube network structure, wherein the carbon nanotube network structure comprises a plurality of carbon nanotubes disorderly arranged.

16. The method of claim 12, wherein the eggshell membrane is obtained from eggs, duck eggs, goose eggs, quail eggs, or bird eggs.

17. The method of claim 12 comprising:
providing a third porous electrode to the electrical energy generating element and a plurality of eggshell membranes, wherein the third porous electrode is arranged on a side of the first porous electrode away from the eggshell membrane between the first and the second porous electrodes, and one of the eggshell membranes is arranged between the third porous electrode and the first porous electrode.

18. The method of claim 12, wherein the liquid is diffused between the first container and the second container by a gravity pull.

* * * * *